(12) United States Patent
Ledbetter et al.

(10) Patent No.: US 11,644,543 B2
(45) Date of Patent: May 9, 2023

(54) LIDAR SYSTEMS AND METHODS THAT USE A MULTI-FACET MIRROR

(71) Applicant: Innovusion Ireland Limited, Los Altos, CA (US)

(72) Inventors: Micah Ledbetter, Sunnyvale, CA (US); Junwei Bao, Los Altos, CA (US); Rui Zhang, Palo Alto, CA (US); Yimin Li, Cupertino, CA (US)

(73) Assignee: Innovusion, Inc., Sunnyvale, CA (US)

( * ) Notice: Subject to any disclaimer, the term of this patent is extended or adjusted under 35 U.S.C. 154(b) by 0 days.

(21) Appl. No.: 17/531,624

(22) Filed: Nov. 19, 2021

(65) Prior Publication Data

US 2022/0082667 A1 Mar. 17, 2022

Related U.S. Application Data

(63) Continuation of application No. 16/682,774, filed on Nov. 13, 2019.

(60) Provisional application No. 62/767,401, filed on Nov. 14, 2018.

(51) Int. Cl.
| | |
|---|---|
| *G01C 3/08* | (2006.01) |
| *G01S 7/481* | (2006.01) |
| *G02B 26/10* | (2006.01) |
| *G02B 26/12* | (2006.01) |
| *G01S 17/10* | (2020.01) |

(52) U.S. Cl.
CPC .......... *G01S 7/4817* (2013.01); *G01S 7/4815* (2013.01); *G01S 17/10* (2013.01); *G02B 26/101* (2013.01); *G02B 26/123* (2013.01)

(58) Field of Classification Search
CPC .... G01S 7/4811; G01S 7/4812; G01S 7/4815; G01S 7/4817; G01S 7/4818; G01S 7/483; G01S 7/484; G01S 7/4861; G01S 7/4865; G01S 7/487; G01S 17/08; G01S 17/10; G01S 17/09; G02B 26/08; G02B 26/0816; G02B 26/101; G02B 26/12; G02B 26/123
See application file for complete search history.

(56) References Cited

U.S. PATENT DOCUMENTS

| | | | |
|---|---|---|---|
| 3,897,150 | A | 7/1975 | Bridges et al. |
| 4,412,720 | A | 11/1983 | Costa |
| 4,464,048 | A | 8/1984 | Farlow |
| 4,923,263 | A | 5/1990 | Johnson |
| 5,006,721 | A | 4/1991 | Cameron et al. |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

"Vuthea et al., "A Design of Risley Scanner for LiDAR Applications", 2018" (Year: 2018).*

(Continued)

*Primary Examiner* — Mark Hellner
(74) *Attorney, Agent, or Firm* — Mauriel Kapouytian Woods LLP; Wensheng Ma; Liang Huang

(57) ABSTRACT

Embodiments discussed herein refer to using LiDAR systems that uses a rotating polygon with a multi-facet mirror. Such multi-facet galvanometer mirror arrangements generate a point map that has reduced curvature.

13 Claims, 22 Drawing Sheets

(56) References Cited

U.S. PATENT DOCUMENTS

| | | | |
|---|---|---|---|
| 5,157,451 A | 10/1992 | Taboada | |
| 5,303,084 A | 4/1994 | Pflibsen et al. | |
| 5,319,434 A | 6/1994 | Croteau et al. | |
| 5,369,661 A | 11/1994 | Yamaguchi et al. | |
| 5,442,358 A | 8/1995 | Keeler et al. | |
| 5,546,188 A | 8/1996 | Wangler et al. | |
| 5,579,153 A | 11/1996 | Laming et al. | |
| 5,657,077 A | 8/1997 | Deangelis et al. | |
| 5,793,491 A | 8/1998 | Wangler et al. | |
| 5,838,239 A | 11/1998 | Stern et al. | |
| 5,864,391 A | 1/1999 | Hosokawa et al. | |
| 5,926,259 A | 7/1999 | Bamberger et al. | |
| 5,936,756 A | 8/1999 | Nakajima | |
| 6,163,378 A | 12/2000 | Khoury | |
| 6,175,440 B1 * | 1/2001 | Conemac | G02B 26/123 348/752 |
| 6,317,202 B1 | 11/2001 | Hosokawa et al. | |
| 6,501,586 B1 * | 12/2002 | Takayama | G02B 26/125 359/206.1 |
| 6,594,000 B2 | 7/2003 | Green et al. | |
| 6,650,404 B1 | 11/2003 | Crawford | |
| 6,788,445 B2 | 9/2004 | Goldberg et al. | |
| 6,788,861 B1 | 9/2004 | Utsui et al. | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,345,271 B2 | 3/2008 | Boehlau et al. | |
| 7,440,084 B2 | 10/2008 | Kane | |
| 7,440,175 B2 | 10/2008 | Di Teodoro et al. | |
| 7,489,865 B2 | 2/2009 | Varshneya et al. | |
| 7,576,837 B2 | 8/2009 | Liu et al. | |
| 7,583,364 B1 | 9/2009 | Mayor et al. | |
| 7,830,527 B2 | 11/2010 | Chen et al. | |
| 7,835,068 B1 | 11/2010 | Brooks et al. | |
| 7,847,235 B2 | 12/2010 | Krupkin et al. | |
| 7,936,448 B2 | 5/2011 | Albuquerque et al. | |
| 7,969,558 B2 | 6/2011 | Hall | |
| 7,982,861 B2 | 7/2011 | Abshire et al. | |
| 8,072,582 B2 | 12/2011 | Meneely | |
| 8,471,895 B2 | 6/2013 | Banks | |
| 8,736,818 B2 | 5/2014 | Weimer et al. | |
| 8,749,764 B2 | 6/2014 | Hsu | |
| 8,812,149 B2 | 8/2014 | Doak | |
| 8,994,928 B2 | 3/2015 | Shiraishi | |
| 9,041,762 B2 | 5/2015 | Bai et al. | |
| 9,048,616 B1 | 6/2015 | Robinson | |
| 9,065,243 B2 | 6/2015 | Asobe et al. | |
| 9,086,273 B1 | 7/2015 | Gruver et al. | |
| 9,194,701 B2 | 11/2015 | Bosch | |
| 9,255,790 B2 | 2/2016 | Zhu | |
| 9,300,321 B2 | 3/2016 | Zalik et al. | |
| 9,304,316 B2 | 4/2016 | Weiss et al. | |
| 9,316,724 B2 | 4/2016 | Gehring et al. | |
| 9,354,485 B2 | 5/2016 | Fermann et al. | |
| 9,368,936 B1 | 6/2016 | Lenius et al. | |
| 9,510,505 B2 | 12/2016 | Halloran et al. | |
| 9,575,184 B2 | 2/2017 | Gilliland et al. | |
| 9,605,998 B2 | 3/2017 | Nozawa | |
| 9,621,876 B2 | 4/2017 | Federspiel | |
| 9,638,799 B2 | 5/2017 | Goodwin et al. | |
| 9,696,426 B2 | 7/2017 | Zuk | |
| 9,702,966 B2 | 7/2017 | Batcheller et al. | |
| 9,804,264 B2 | 10/2017 | Villeneuve et al. | |
| 9,810,786 B1 | 11/2017 | Welford et al. | |
| 9,812,838 B2 | 11/2017 | Villeneuve et al. | |
| 9,823,353 B2 | 11/2017 | Eichenholz et al. | |
| 9,857,468 B1 | 1/2018 | Eichenholz et al. | |
| 9,869,754 B1 | 1/2018 | Campbell et al. | |
| 9,880,263 B2 | 1/2018 | Droz et al. | |
| 9,880,278 B2 | 1/2018 | Uffelen et al. | |
| 9,885,778 B2 | 2/2018 | Dussan | |
| 9,897,689 B2 | 2/2018 | Dussan | |
| 9,915,726 B2 | 3/2018 | Bailey et al. | |
| 9,927,915 B2 | 3/2018 | Frame et al. | |
| 9,958,545 B2 | 5/2018 | Eichenholz et al. | |
| 10,007,001 B1 | 6/2018 | LaChapelle et al. | |
| 10,012,732 B2 | 7/2018 | Eichenholz et al. | |
| 10,031,214 B2 | 7/2018 | Rosenzweig et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,078,133 B2 | 9/2018 | Dussan | |
| 10,094,925 B1 | 10/2018 | LaChapelle | |
| 10,157,630 B2 | 12/2018 | Vaughn et al. | |
| 10,191,155 B2 | 1/2019 | Curatu | |
| 10,215,847 B2 | 2/2019 | Scheim et al. | |
| 10,267,898 B2 | 4/2019 | Campbell et al. | |
| 10,295,656 B1 | 5/2019 | Li et al. | |
| 10,310,058 B1 | 6/2019 | Campbell et al. | |
| 10,324,170 B1 * | 6/2019 | Engberg, Jr. | G01S 7/4818 |
| 10,324,185 B2 | 6/2019 | McWhirter et al. | |
| 10,393,877 B2 | 8/2019 | Hall et al. | |
| 10,429,495 B1 | 10/2019 | Wang et al. | |
| 10,444,356 B2 | 10/2019 | Wu et al. | |
| 10,451,716 B2 | 10/2019 | Hughes et al. | |
| 10,466,342 B1 | 11/2019 | Zhu et al. | |
| 10,502,831 B2 | 12/2019 | Eichenholz | |
| 10,509,112 B1 | 12/2019 | Pan | |
| 10,520,602 B2 | 12/2019 | Villeneuve et al. | |
| 10,557,923 B2 | 2/2020 | Watnik et al. | |
| 10,571,567 B2 | 2/2020 | Campbell et al. | |
| 10,578,720 B2 | 3/2020 | Hughes et al. | |
| 10,591,600 B2 | 3/2020 | Villeneuve et al. | |
| 10,598,790 B2 | 3/2020 | Rubin | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,732,281 B2 | 8/2020 | LaChapelle | |
| 10,768,304 B2 | 9/2020 | England et al. | |
| 10,908,262 B2 | 2/2021 | Dussan | |
| 10,908,265 B2 | 2/2021 | Dussan | |
| 10,908,268 B2 | 2/2021 | Zhou et al. | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,016,192 B2 | 5/2021 | Pacala et al. | |
| 11,194,048 B1 | 12/2021 | Burbank et al. | |
| 2002/0136251 A1 | 9/2002 | Green et al. | |
| 2003/0184835 A1 * | 10/2003 | Goldberg | G02B 26/123 359/204.1 |
| 2004/0135992 A1 | 7/2004 | Munro | |
| 2005/0033497 A1 | 2/2005 | Stopczynski | |
| 2005/0190424 A1 | 9/2005 | Reichenbach et al. | |
| 2005/0195383 A1 | 9/2005 | Breed et al. | |
| 2005/0219504 A1 | 10/2005 | Adachi et al. | |
| 2006/0071846 A1 | 4/2006 | Yanagisawa et al. | |
| 2006/0132752 A1 | 6/2006 | Kane | |
| 2006/0209373 A1 * | 9/2006 | Kato | G02B 26/123 359/205.1 |
| 2007/0091948 A1 | 4/2007 | Di Teodoro et al. | |
| 2007/0216995 A1 | 9/2007 | Bollond et al. | |
| 2008/0174762 A1 | 7/2008 | Liu et al. | |
| 2008/0193135 A1 | 8/2008 | Du et al. | |
| 2009/0002678 A1 | 1/2009 | Tanaka et al. | |
| 2009/0010644 A1 | 1/2009 | Varshneya et al. | |
| 2009/0051926 A1 | 2/2009 | Chen | |
| 2009/0059201 A1 | 3/2009 | Willner et al. | |
| 2009/0067453 A1 | 3/2009 | Mizuuchi et al. | |
| 2009/0091732 A1 * | 4/2009 | Kato | G02B 26/123 355/67 |
| 2009/0147239 A1 | 6/2009 | Zhu | |
| 2009/0153644 A1 * | 6/2009 | Naito | G02B 26/124 347/243 |
| 2009/0262760 A1 | 10/2009 | Krupkin et al. | |
| 2009/0316134 A1 | 12/2009 | Michael et al. | |
| 2010/0006760 A1 | 1/2010 | Lee et al. | |
| 2010/0020306 A1 | 1/2010 | Hall | |
| 2010/0020377 A1 * | 1/2010 | Borchers | G02B 26/101 359/216.1 |
| 2010/0027602 A1 | 2/2010 | Abshire et al. | |

(56) References Cited

U.S. PATENT DOCUMENTS

| | | |
|---|---|---|
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0063703 A1* | 3/2011 | Ishibe .................. G02B 26/123 359/204.1 |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2012/0260512 A1 | 10/2012 | Kretschmer et al. |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0229912 A1 | 8/2015 | Masalkar et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0006914 A1 | 1/2016 | Neumann |
| 2016/0047896 A1 | 2/2016 | Dussan |
| 2016/0047900 A1 | 2/2016 | Dussan |
| 2016/0047902 A1 | 2/2016 | Ishikawa et al. |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik et al. |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0113200 A1 | 4/2018 | Steinberg et al. |
| 2018/0136331 A1* | 5/2018 | Rosenzweig ......... G01S 7/4863 |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284234 A1 | 10/2018 | Curatu |
| 2018/0284237 A1* | 10/2018 | Campbell ............. G01S 17/931 |
| 2018/0284241 A1 | 10/2018 | Campbell et al. |
| 2018/0284242 A1 | 10/2018 | Campbell |
| 2018/0284286 A1* | 10/2018 | Eichenholz ............ G01S 17/89 |
| 2018/0286320 A1* | 10/2018 | Tardif ................ G02B 27/0172 |
| 2018/0292532 A1 | 10/2018 | Meyers et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0101645 A1* | 4/2019 | DeMersseman ...... G01S 7/4812 |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0250270 A1 | 8/2019 | Suzuki et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1* | 9/2020 | Eichenholz ........ G02B 27/0955 |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 108051868 A * | 5/2018 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 4142702 A1 | 6/1993 |
| EP | 0 757 257 A2 | 5/2002 |
| EP | 1 237 305 A2 | 9/2002 |
| EP | 1 923 721 A1 | 5/2008 |

(56) References Cited

FOREIGN PATENT DOCUMENTS

| | | | |
|---|---|---|---|
| EP | 2 157 445 A2 | | 2/2010 |
| EP | 2 395 368 A1 | | 12/2011 |
| EP | 2 889 642 A1 | | 7/2015 |
| GB | 1 427 164 A | | 3/1976 |
| GB | 2000411 | | 1/1979 |
| JP | S628119 A | | 1/1987 |
| JP | H0683998 A | | 3/1994 |
| JP | H11194018 A * | 7/1999 | ............ G01B 11/24 |
| JP | 2007144667 A | | 6/2007 |
| JP | 2008-298520 A | | 12/2008 |
| JP | 2009-121836 A | | 6/2009 |
| JP | 2010035385 A | | 2/2010 |
| JP | 2014115182 A | | 6/2014 |
| JP | 2016-40662 A | | 3/2016 |
| JP | 2017-003347 A | | 1/2017 |
| JP | 2017-138301 A | | 8/2017 |
| JP | 2017138301 A * | 8/2017 | ........... G01S 7/4813 |
| KR | 10-2012-0013515 A | | 2/2012 |
| KR | 10-2013-0068224 A | | 6/2013 |
| KR | 10-2018-0107673 A | | 10/2018 |
| WO | 98/16801 A1 | | 4/1998 |
| WO | 2016/056545 A1 | | 4/2016 |
| WO | 2017/110417 A1 | | 6/2017 |
| WO | 2018/125725 A1 | | 7/2018 |
| WO | 2018/129410 A1 | | 7/2018 |
| WO | 2018126248 A1 | | 7/2018 |
| WO | 2018129408 A1 | | 7/2018 |
| WO | 2018129409 A1 | | 7/2018 |
| WO | 2018129410 A1 | | 7/2018 |
| WO | 2018175990 | | 9/2018 |
| WO | 2018182812 A2 | | 10/2018 |
| WO | 2019079642 | | 4/2019 |
| WO | 2019165095 | | 8/2019 |
| WO | 2019165289 A1 | | 8/2019 |
| WO | 2019165294 | | 8/2019 |
| WO | 2020013890 A2 | | 1/2020 |

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

International Search Report and Written Opinion, dated Jun. 7, 2018, for International Application No. PCT/US2018/024185, 9 pages.

International Preliminary Report on Patentability, dated Apr. 30, 2020, for International Application No. PCT/US2018/056577, 8 pages.

European Search Report, dated Jul. 17, 2020, for EP Application No. 18776977.3, 12 pages.

Extended European Search Report, dated Jul. 10, 2020, for EP Application No. 18736738.8, 9 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

Extended European Search Report, dated Jul. 22, 2020, for EP Application No. 18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Office Action Issued in Japanese Patent Application No. 2019-536019 dated Nov. 30, 2021, 6 pages.

European Search Report, dated Jun. 17, 2021, for EP Application No. 18868896.4, 7 pages.

"Fiber laser," Wikipedia, https://en.wikipedia.org/wiki/Fiber_laser, 6 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

"Mirrors", Physics LibreTexts, https://phys.libretexts.org/Bookshelves/Optics/Supplemental_Modules_(Components)/Mirrors, (2021), 2 pages.

"Why Wavelengths Matter in Fiber Optics", FirstLight, https://www.firstlight.net/why-wavelengths-matter-in-fiber-optics/, (2021), 5 pages.

Notice of Reasons for Refusal, Japanese Patent Application No. 2021-110848, dated Apr. 26, 2622, 16 pages.

Niewola at al., A novel 3D laser scanner design for variable density scanning, Proceedings of the 12th International Workshop on Robot Motion and Control, Poznan University of Technology, Poznan, Poland, Jul. 8-10, 2019, 6 pages.

Communication Relating to the Results of the Partial International Search and Provisional Opinion, International Application No. PCT/US2022/025248, dated Jul. 15, 2022, 18 pages.

Notice of Allowance issued in Korean Patent Application No. 10-2021-7041437 dated Apr. 28, 2022, 6 pages.

\* cited by examiner a = -5     -2.5   40   -14.8   10
a = -6     2.5   40   -14.8   -10
b = -3
g = 25
Xm = 50
Ym = -17.5 a = -5     -2.5   40   -14.8   10
a = -6     2.5   40   -14.8   -10
b = -3
g = 25
Xm = 50
Ym = -17.5

LIDAR SYSTEMS AND METHODS THAT USE A MULTI-FACET MIRROR

This application is a continuation of U.S. application Ser. No. 16/682,774, entitled "LIDAR SYSTEMS THAT USE A MULTI-FACET MIRROR", filed Nov. 13, 2019, which claims the benefit of U.S. Provisional Application No. 62/767,401, entitled "LIDAR SYSTEMS THAT USE A MULTI-FACET MIRROR", filed Nov. 14, 2018. The disclosure of both applications are incorporated herein in their entirety. This application is related to U.S. application Ser. No. 16/242,534, entitled "LIDAR DETECTION SYSTEMS AND METHODS," filed on Jan. 8, 2019 and U.S. application Ser. No. 16/242,567, entitled "LIDAR DETECTION SYSTEMS AND METHODS THAT USE MULTI-PLANE MIRRORS," filed on Jan. 8, 2019.

FIELD OF THE INVENTION

The present disclosure relates generally to laser scanning and, more particularly, to using a rotating polygon in conjunction with a multi-facet mirror.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Light detection and ranging (LiDAR) systems, for example, can provide the sensory input required by a semi-autonomous or fully autonomous vehicle. LiDAR systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment

BRIEF SUMMARY

Embodiments discussed herein refer to using LiDAR systems that use a rotating polygon in conjunction with a multi-facet galvanometer mirror. Such multi-facet galvanometer mirror arrangements generate a point map that has reduced curvature.

In one embodiment, a LiDAR system is provided that includes a beam steering system including a polygon having a plurality of facets and operative to rotate around a first rotational axis, and a multi-facet mirror operative to rotate about a second rotational axis, wherein a planar face of at least one facet of the multi-facet mirror is aligned at a non zero skew angle with respect to the second rotational axis. The LiDAR system can also include a laser system operative to emit light pulses that are steered by the beam steering system within a field of view (FOV) of the LiDAR system, and a receiver system operative to process return pulses corresponding to the emitted light pulses to generate a point map of the FOV.

In one embodiment, a LiDAR system is provided that includes a beam steering system having a polygon system comprising a polygon operative to rotate around a first rotational axis and a multi-facet mirror system, which can include a mirror rotation mechanism, and a multi-facet galvanometer mirror (MFGM) operative to rotate about a second rotational axis under the control of the mirror rotation mechanism, wherein the MFGM comprises a plurality of facets, and where a planar face of at least one facet is aligned at a non zero skew angle with respect to the second rotational axis. The LiDAR system can include a laser system operative to emit a plurality of light beams that are steered by the beam steering system within a field of view (FOV) the LiDAR system, a receiver system operative to process return pulses corresponding to the emitted light pulses to generate a point map of the FOV, and a controller operative to control the laser system and the mirror rotation mechanism.

In one embodiment, a LiDAR system is provided that includes a beam steering system having a motor, a polygon comprising a plurality of facets and operative to rotate around a first rotational axis, and a multi-facet mirror comprising at least two facets coupled together via a joint member, wherein the motor is operative to oscillate a first facet of the at least two facets about a second rotational axis, and wherein the joint member is operative to oscillate a second facet of the at least two facets about a third rotational axis in conjunction with operation of the motor. The LiDAR system can include a laser system operative to emit light pulses that are steered by the beam steering system within a field of view (FOV) the LiDAR system, and a receiver system operative to process return pulses corresponding to the emitted light pulses to generate a point map of the FOV.

A further understanding of the nature and advantages of the embodiments discussed herein may be realized by reference to the remaining portions of the specification and the drawings.

DETAILED DESCRIPTION

Figure 1:
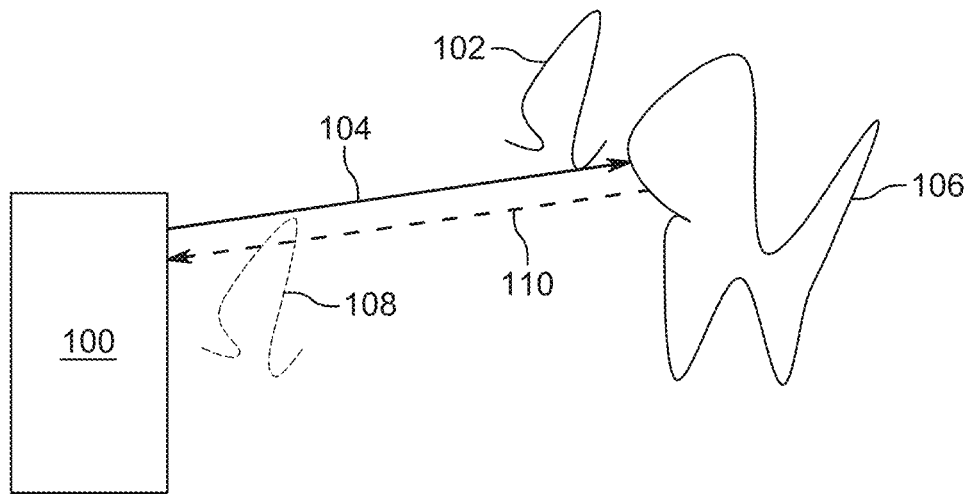
FIGS. 1-3 illustrate an exemplary LiDAR system using pulse signal to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). When these systems use mechanical means to direct the pulses, the system complexity increases because more moving parts are required. Additionally, only a single signal can be emitted at any one time because two or more identical signals would introduce ambiguity in returned signals. In some embodiments of the present technology, these disadvantages and/or others are overcome.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. In addition, overlapping scanning areas enable regions of higher resolution. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
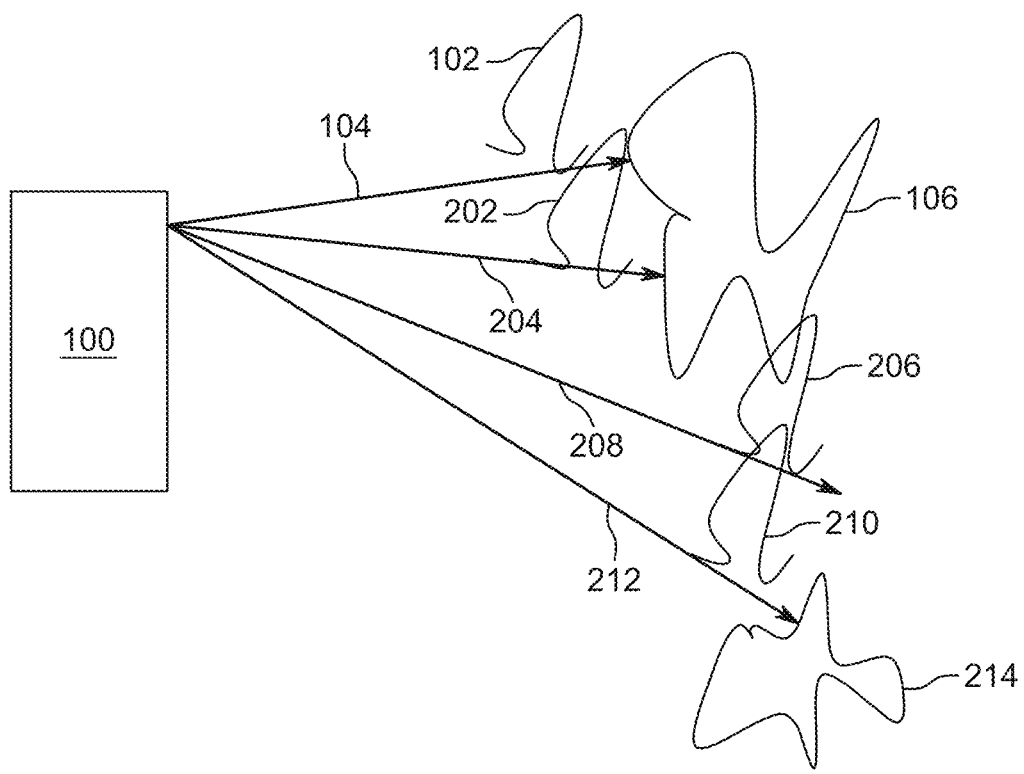
Figure 3:
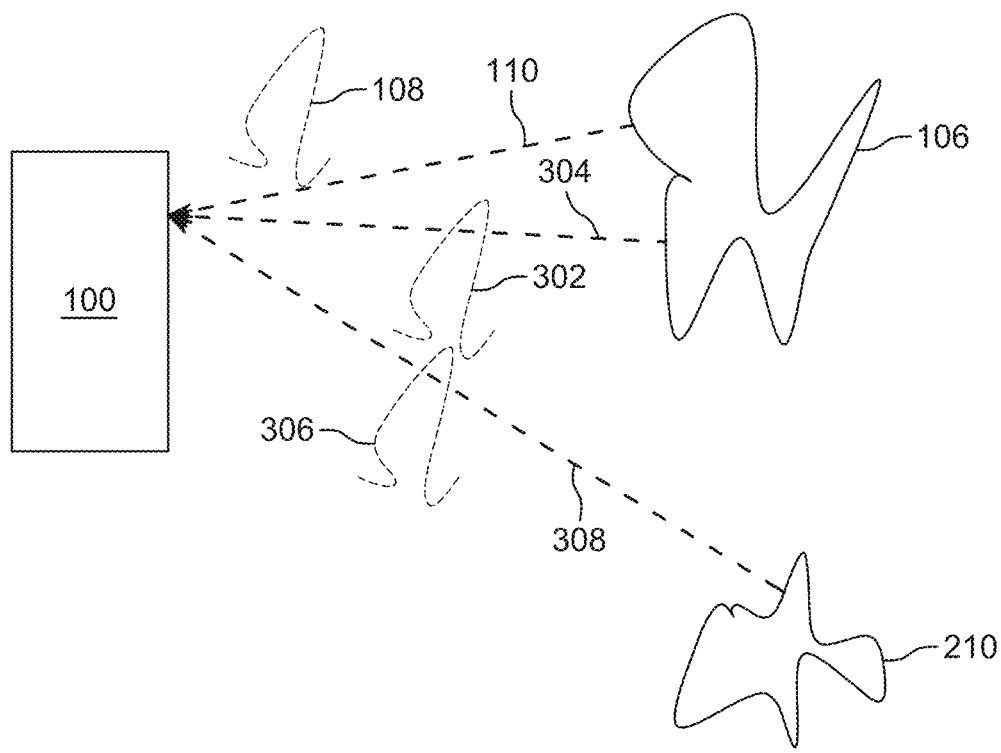

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
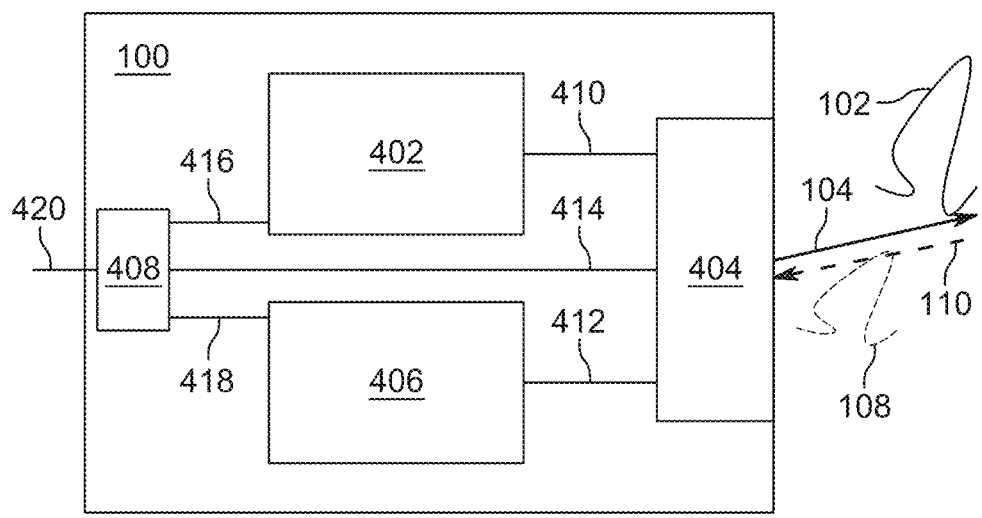
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
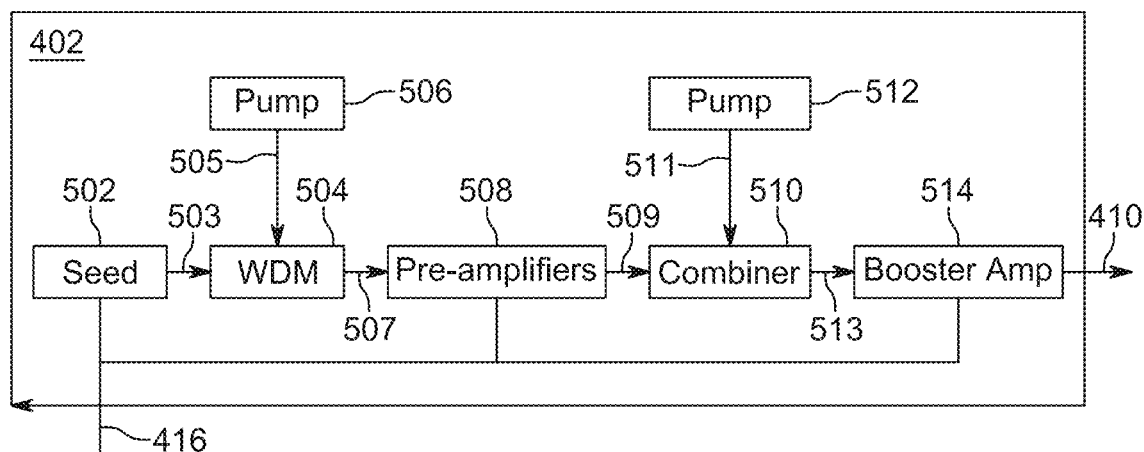
FIG. 5 depicts a light source of the exemplary LiDAR system.

FIG. 5 depicts a logical block diagram of one example of light source 402 that is based on a fiber laser, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402.

Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. Patent Application Publication No. 2018/0188355, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
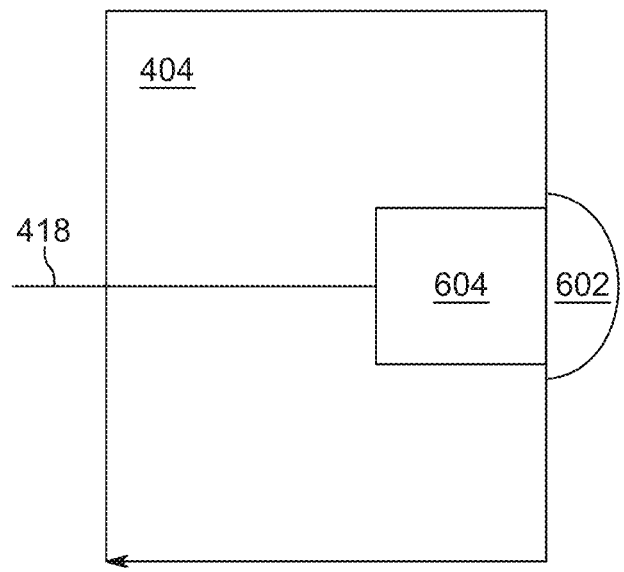
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 404 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
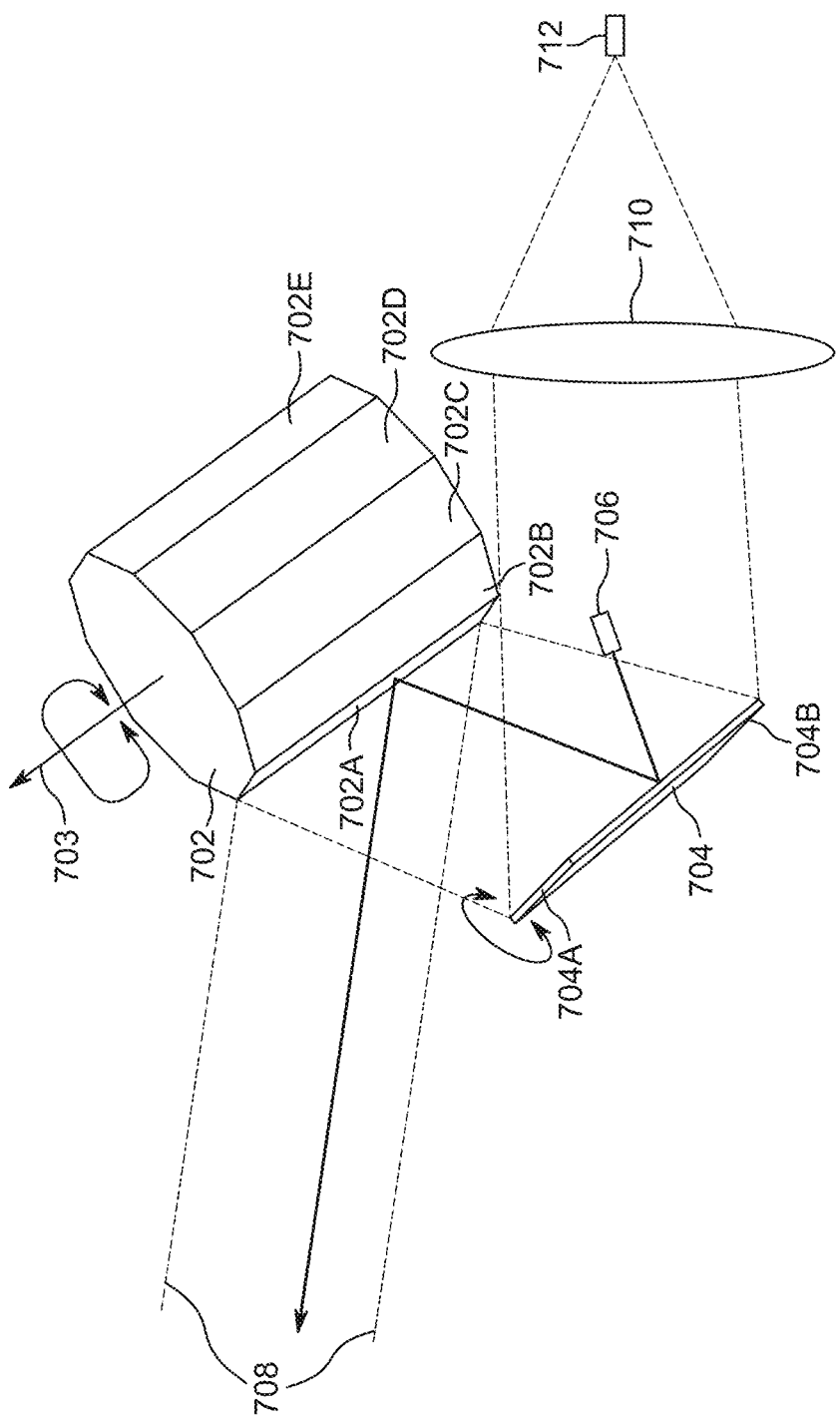
FIG. 7 depicts an embodiment of a signal steering system using a single light source and detector.

FIG. 7 depicts an embodiment of a signal steering system (e.g., signal steering system 404 of FIG. 4) according to some embodiments of the present technology. Polygon 702 has ten reflective sides (sides 702A-702E are visible in FIG. 7) but can have any number of reflective sides. For example, other examples of polygon 702 has 6, 8, or 20 sides). Polygon 702 rotates about axis 703 based on a drive motor (not shown) to scan signals delivered from a light source (e.g., via output 706, which is connected to a light source such as light source 402 described above) along a direction perpendicular or at a non-zero angle to axis of rotation 703.

Mirror galvanometer 704 is positioned next to polygon 702 so that one or more signals emitted from light source output 706 (e.g., a fiber tip) reflect off of mirror galvanometer 704 and onto rotating polygon 702. Mirror galvanometer 704 tilts so as to scan one or more signals from output 706 to a direction different than the direction that polygon 702 scans signals In some examples, polygon 702 is responsible for scanning one or more signals in the horizontal direction of the LiDAR system and mirror galvanometer 704 is responsible for scanning one or more signals in the vertical direction. In some other examples, polygon 702 and mirror galvanometer 704 are configured in the reverse manner. While the example in FIG. 7 uses a mirror galvanometer, other components can be used in its place. For example, one or more rotating mirrors or a grating (with different wavelength pulses) may be used. The solid black line represents one example signal path through the signal steering system.

Light returned from signal scattering (e.g., when a light hits an object) within region 708 (indicated by dashed lines) is returned to rotating polygon 702, reflected back to mirror galvanometer 704, and focused by lens 710 onto detector 712. While lens 710 is depicted as a single lens, in some variations it is a system of one or more optics.

Figure 8A:
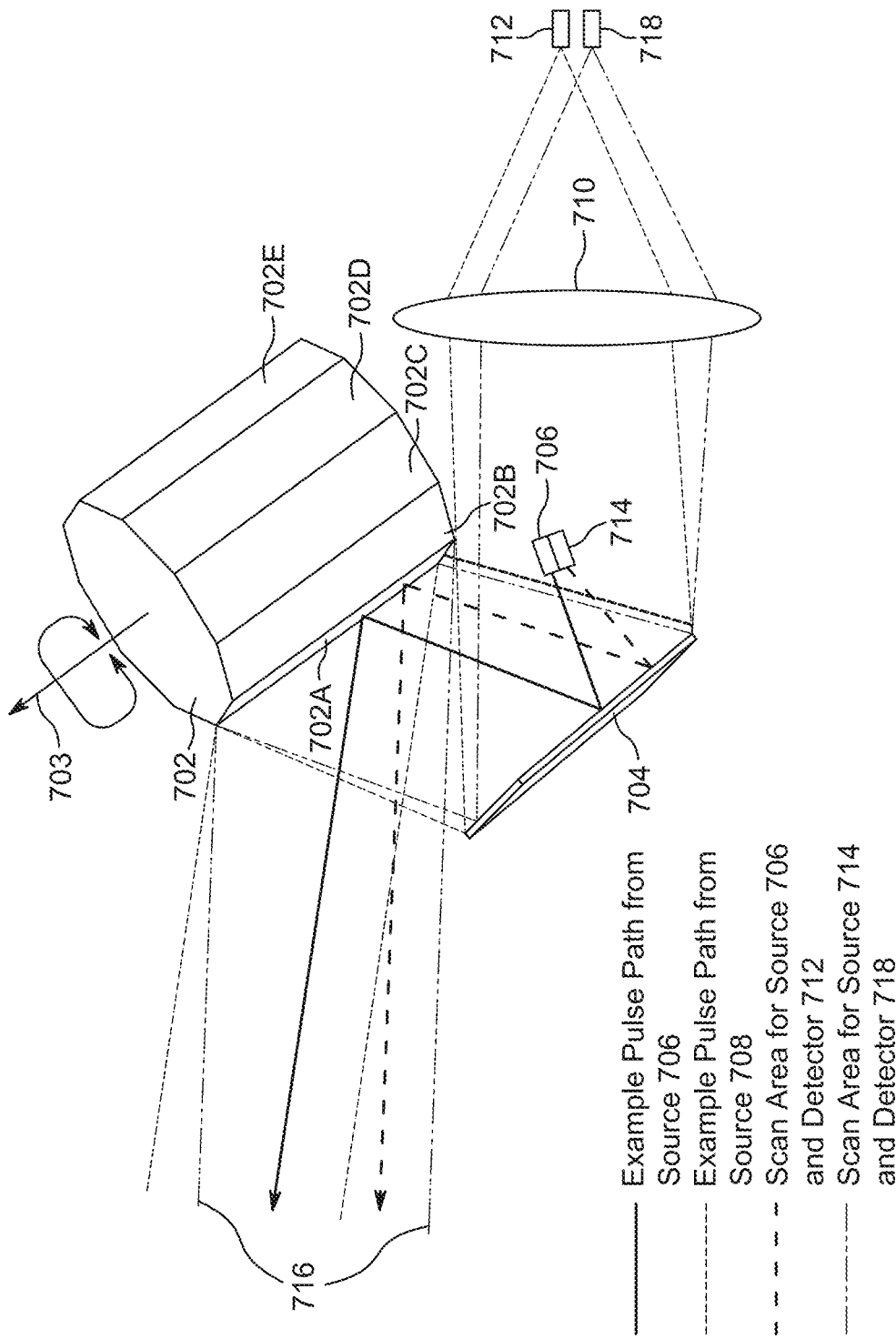
FIG. 8A depicts another embodiment of a signal steering system.

FIG. 8A depicts a similar system as depicted in FIG. 7 except a second light source is added that provides one or more signals from output 714. The light source for output 714 may be the same or different than the light source for output 706, and the light transmitted by output 714 may have the same or a different wavelength as the light transmitted by output 706. Using multiple light outputs can increase the points density of a points map without sacrificing the maximum unambiguous detection range of the system. For example, light output 714 can be positioned to transmit light at a different angle from output 706. Because of the different angles, light transmitted from light source 706 is directed to an area different from light transmitted from output 714. The dotted line shows one example pulse path for pulses emitted from output 714. Consequently, one or more objects located at two different areas within a region can scatter and return light to the LiDAR system. For example, the region 716 (the dashed/double-dotted line) indicates the region from which return signals from scattered signals returns to the LiDAR system. The returned light is reflected off polygon 702 and mirror galvanometer 704 and focused on detectors 712 and 718 by lens 710. Detectors 712 and 718 can each be configured to receive returned light from one of the outputs 706 and 714, and such configuration can be achieved by precisely controlling the position of the detectors 712 and 718 as well as the wavelength(s) of the transmitted light. Note that the same lens (or optic system) can be used for both detector 712 and 718. The offset between outputs 706 and 714 means that the light returned to the LiDAR system will have a similar offset. By properly positioning detectors 712 and 718 based on the relative positioning of their respective light source outputs (e.g., respective positions of outputs 706 and 714) and, optionally, by properly controlling the wavelength(s) of the transmitted light, the returned light will be properly focused on to the correct detectors, and each received light can be a point in the points map. Each received light pulse can be interpreted as a point in 3D space. Therefore, compared to the system with only one output 706, the system with two outputs can maintain the same pulse repetition rate and produce twice the number of points or reduce the pulse repetition rate by half and still produce the same number of points. As a non-limiting example, a system with two light outputs can reduce the pulse repetition rate from 1 MHz to 500 KHz, thereby increasing its maximum unambiguous detection range from 150 meters to 300 meters, without sacrificing points density of the resulting points map. A pulse repetition rate of between 200 kHz and 2 MHz is contemplated and disclosed.

Figure 8B:
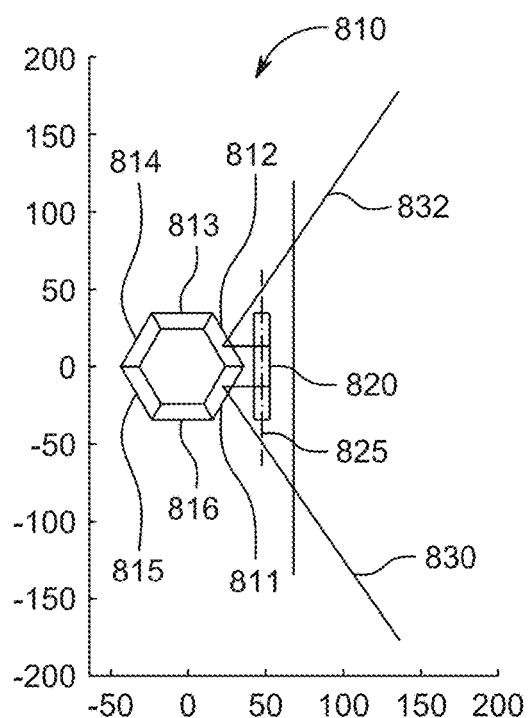
FIGS. 8B-8D show simplified alternative views of the LiDAR system of FIG. 8A according an embodiment.
Figure 8C:
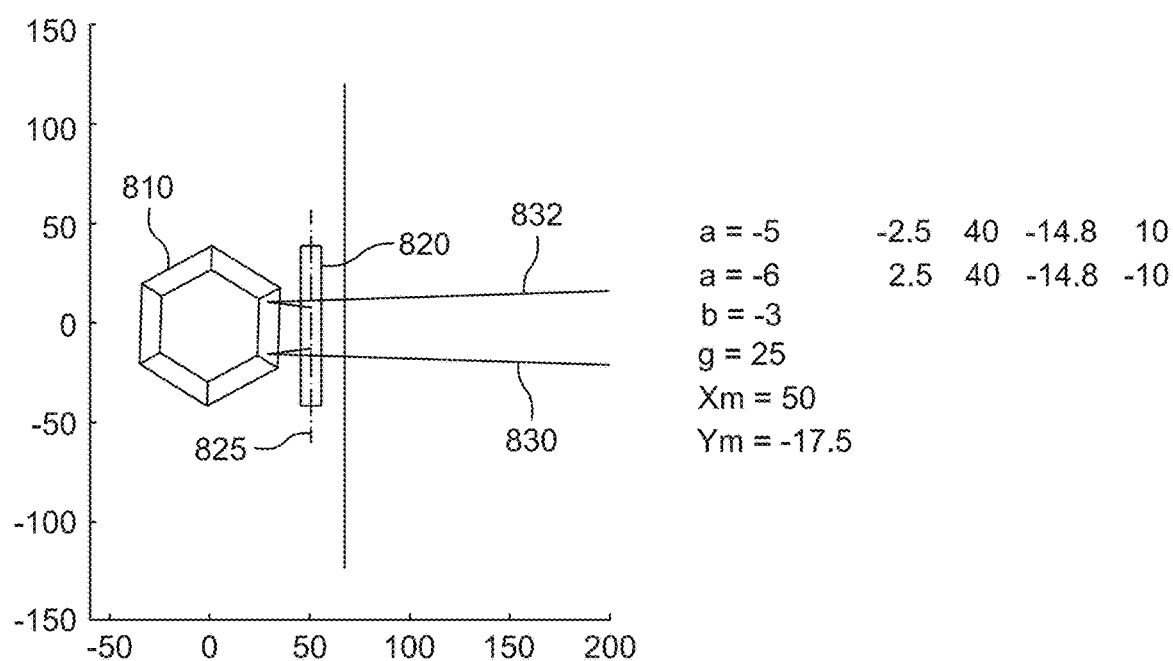
Figure 8D:
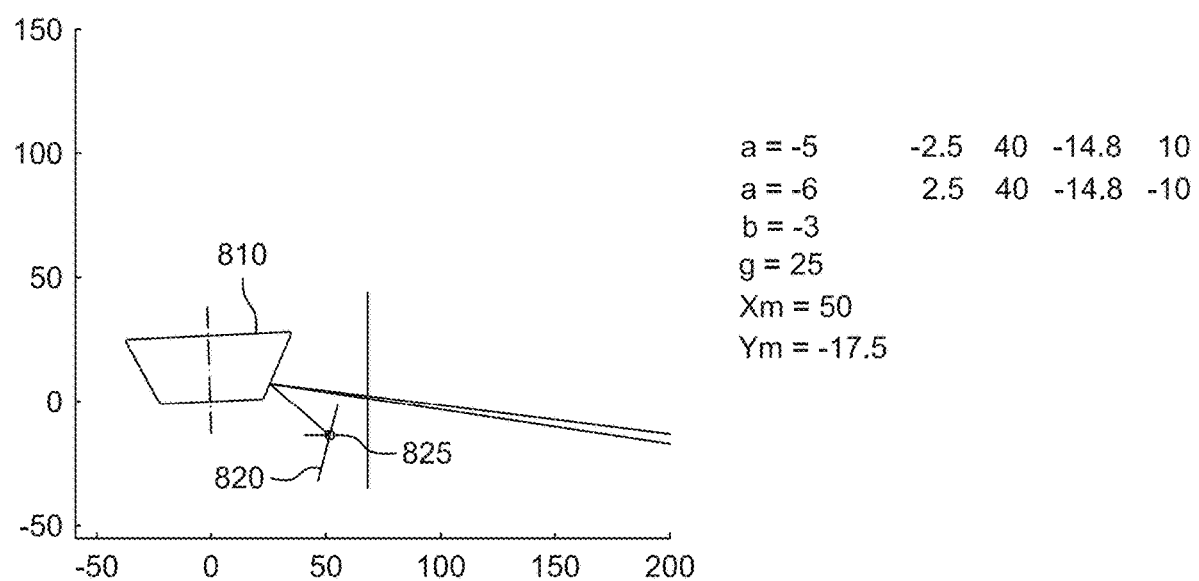

FIGS. 8B-8D show simplified alternative views of the LiDAR system of FIG. 8A according an embodiment. In particular, FIGS. 8B and 8C show illustrative top views and FIG. 8D shows an illustrative side view. As shown, polygon 810 has six facets 811-816 and mirror galvanometer 820 has one facet. Mirror 820 rotates about mirror rotation axis 825. Mirror 820 is aligned such that is parallel to rotation axis 825. That is, a planar face of mirror 820 is parallel to the mirror rotation axis 825. A skew angle is defined as the angle existing between the planar face of the mirror and the rotation axis. When the planar face and the rotation axis are parallel to each other, the skew angle is zero (0). Two light beams 830 and 832 are shown originating from their respective sources (not shown) by first interfacing with mirror galvanometer 820 and then interfacing with polygon 810, which redirects the light beams to the FOV. Depending on the rotation orientation of polygon 810, light beams 830 and 832 may interact with the same facet (as shown in FIG. 8C) or two or more facets (as shown in FIG. 8B). Simultaneous interaction with multiple facets can increase the field of view of the LiDAR system, however, the point maps obtained from such a polygon/galvanometer mirror configuration may include curvature such as that shown, for example, in FIGS. 9A-9D, below.

Figure 9A:
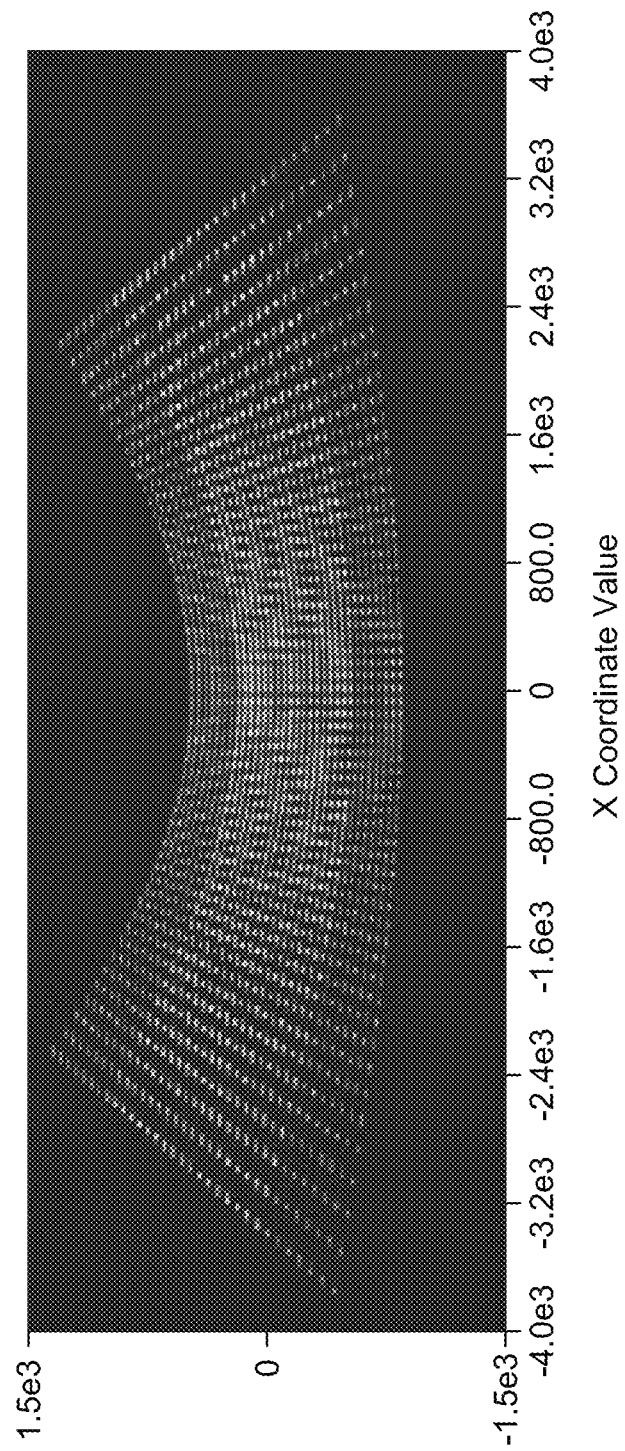
FIGS. 9A-9C depict point maps from different designs.

FIG. 9A depicts a point map from a first design. This design has two channels (e.g., two light source outputs and two light detectors) placed in a way that the exiting beams have an angle of 8 degrees between them. The scanned pattern has vertical overlap. The scanned range is +−56 degrees horizontally and +12~−20 degrees vertically.

Figure 9B:
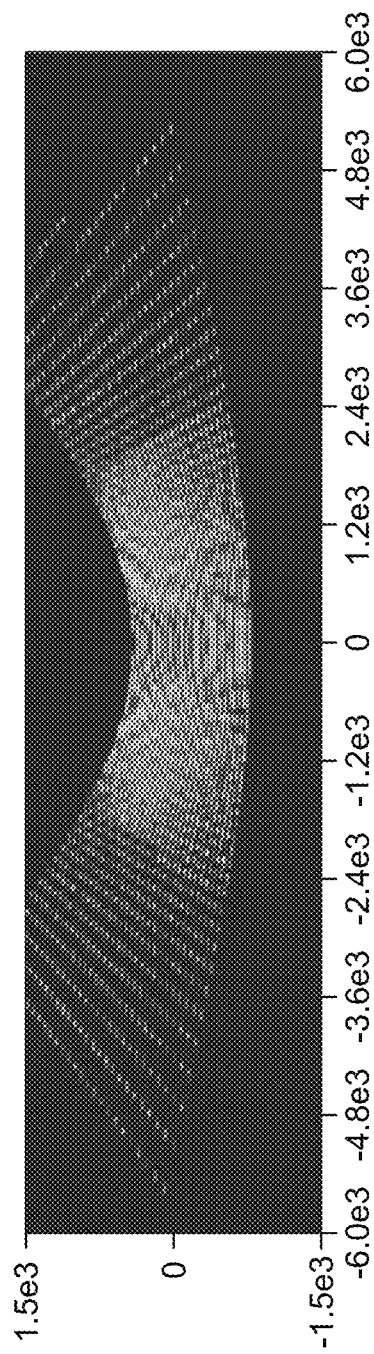

FIG. 9B depicts a point map from a second design. This design has two channels (e.g., two light source outputs and two light detectors) placed in a way that the exiting beams have an angle of 6 degrees between them. The scanned pattern has horizontal overlap (+−45 degrees). The scanned range is +−67 degrees horizontally and +12~−20 degrees vertically.

Exiting beams of two channels are not necessary to separate with a certain angle (e.g. 6 degree in FIG. 9B) to obtain a larger horizontal range. Horizontal displacement of existing beams can be used to expand the horizontal range. For example, two exit beams may be pointed that same angle, but are offset with respect to each other in the same plane. Due to these different positions, each channel is reflected by different part of polygon and therefore covers a different horizontal range. By combining the two channels, the total horizontal range is increased.

Figure 9C:
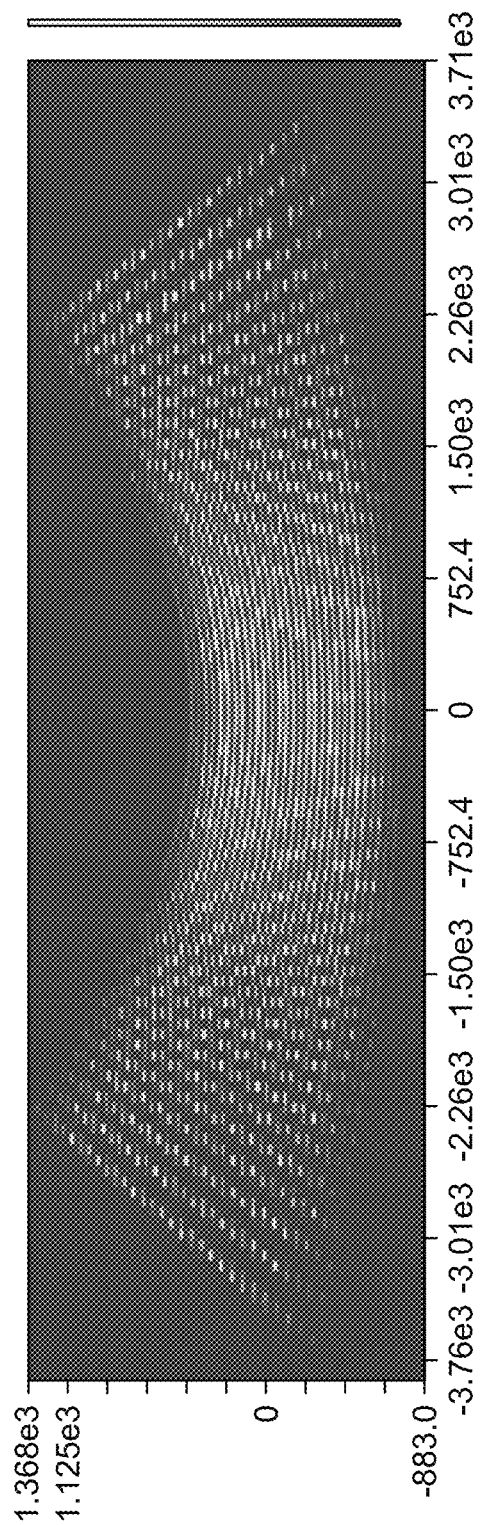

FIG. 9C depicts a point map from a third design. This design has three channels (e.g., three light source outputs and three light detectors) to increase point density. About 2.88 million points per second can be obtained by using 3 fiber tips and 3 detectors. The resolution can be further reduced to 0.07 degrees for both directions. The speed of the polygon can be reduced to 6000 rpm.

Figure 9D:
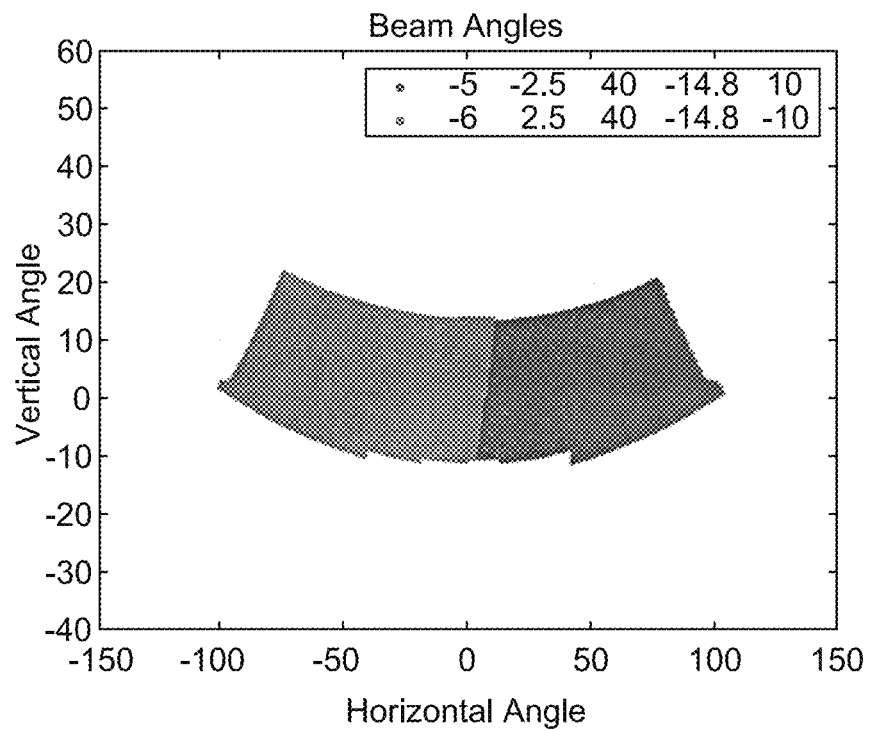
FIG. 9D shows a point map that may be produced using LiDAR system shown in FIGS. 8B-8D according to an embodiment.
Figure 9E:
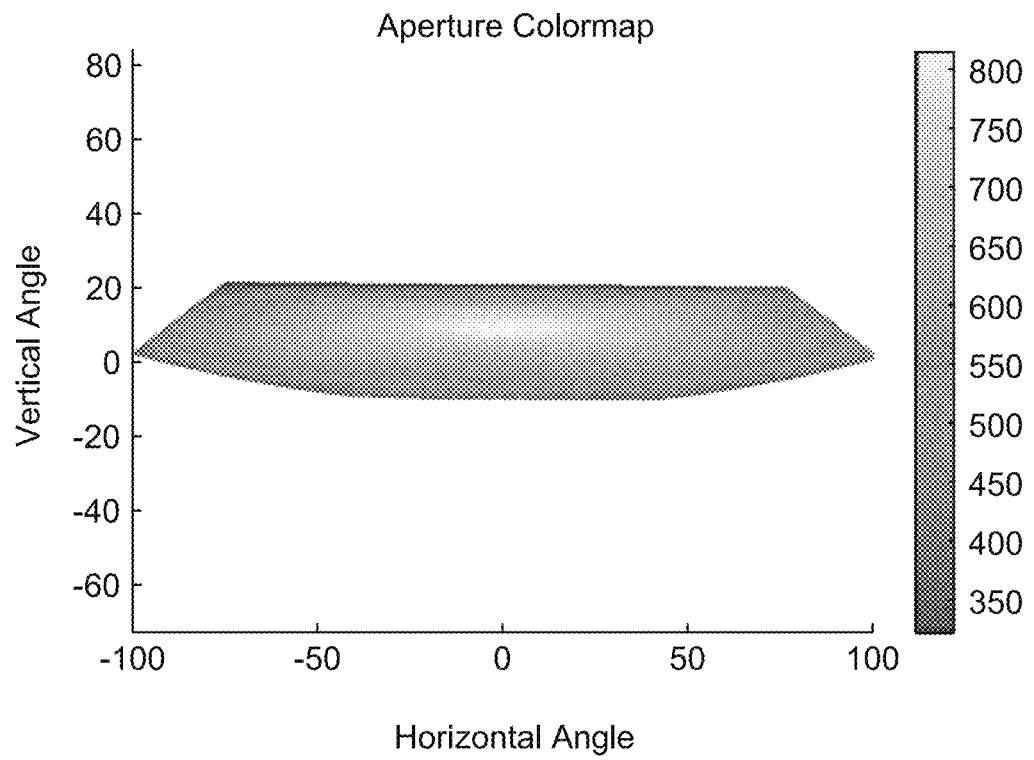
FIG. 9E shows an illustrative aperture color map produced by LiDAR system of FIGS. 8B-8D according to an embodiment.

FIG. 9D shows a point map that may be produced using LiDAR system shown in FIGS. 8B-8D according to an embodiment. As shown, the point map shows that a relatively large FOV is captured (e.g., approximately −100 to +100 degrees), with curvature being present. FIG. 9E shows an illustrative aperture color map produced by LiDAR system of FIGS. 8B-8D. The aperture refers to the area, or cross section, of the receiving optics and is proportional to the transmitted light energy that is received and detected.

Figure 10A:
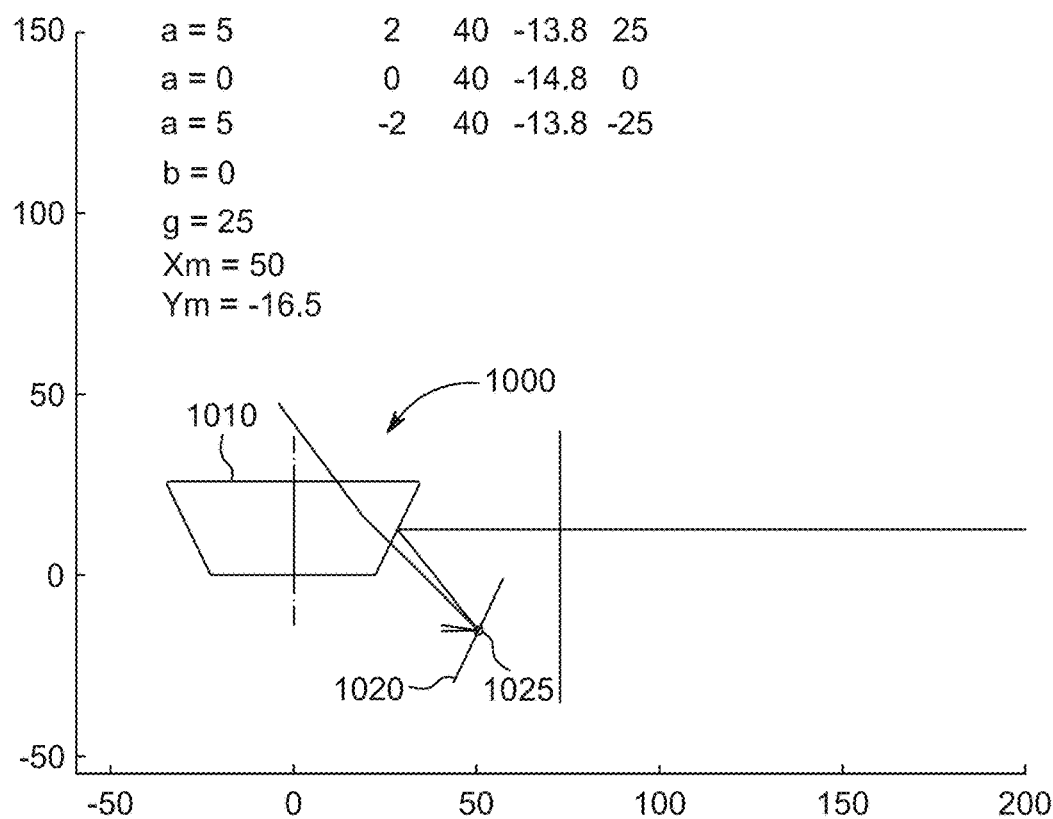
FIGS. 10A and 10B show simplified views of a LiDAR system according to an embodiment.
Figure 10B:
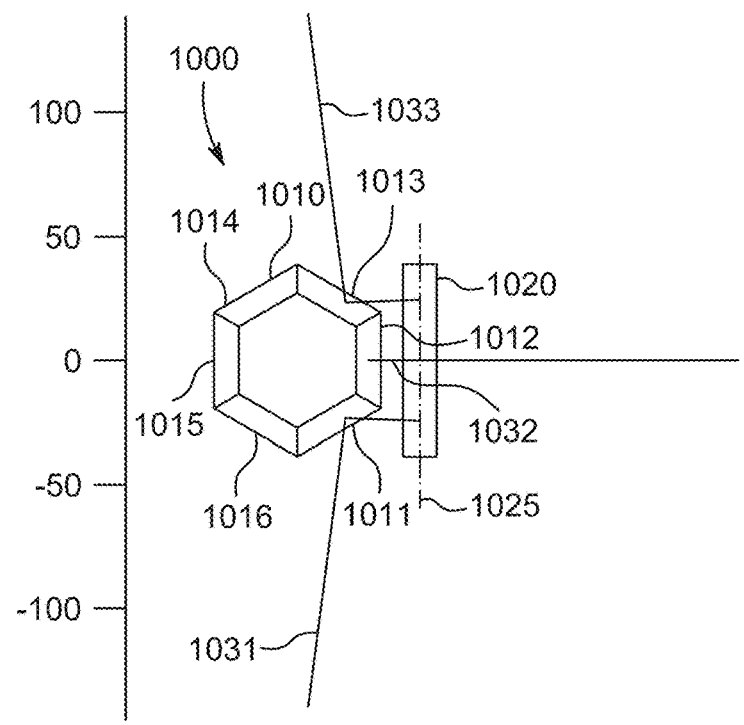

FIGS. 10A and 10B show simplified views of LiDAR system 1000 according to an embodiment. LiDAR system 1000 includes polygon 1010, which includes facets 1011-1016, and single faceted mirror 1020. Mirror 1020 is sized such that it is able to reflect light beams that simultaneously interact with three different facets of polygon 1010 (as shown in FIG. 10B). Mirror 1020 rotates about mirror rotation axis 1025. Mirror 1020 is aligned such that its planar surface is parallel to rotation axis 1025, resulting in a skew angle of 0. Three laser beams 1031-1033 are shown interfacing with mirror 1020, which redirects beams 1031-1033 to facets 1011-1013, respectively.

Figure 11A:
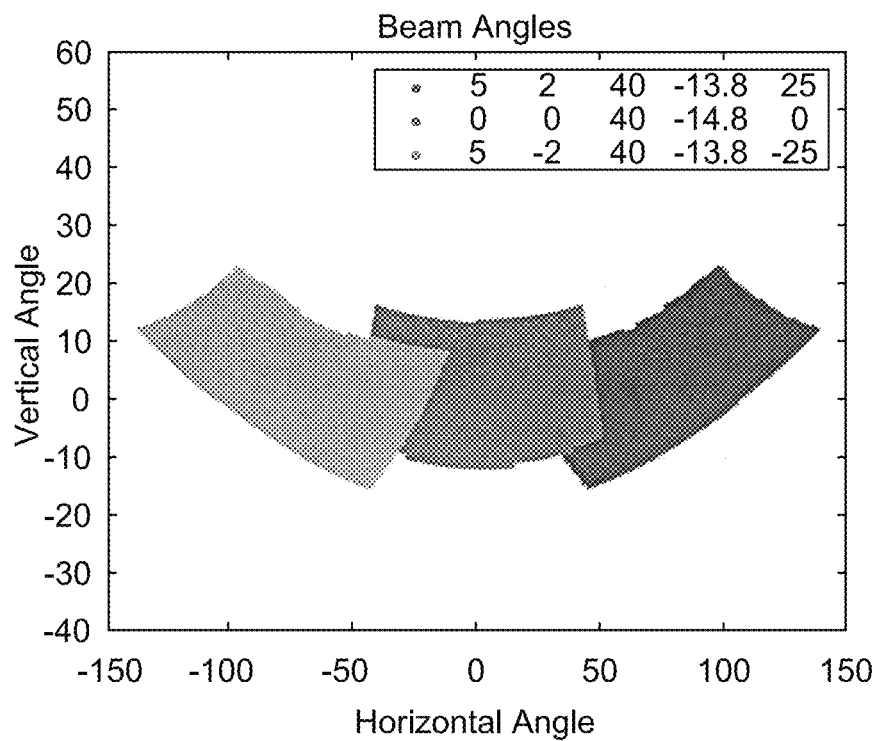
FIG. 11A shows a point map that may be produced using a LiDAR system according to an embodiment.
Figure 11B:
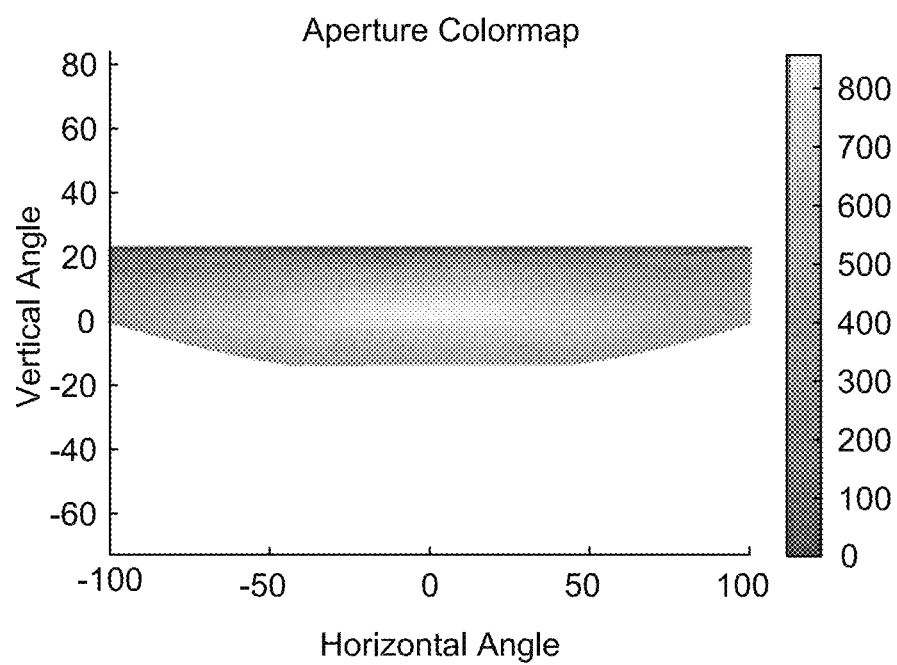
FIG. 11B shows an illustrative aperture color map produced by a LiDAR system, according to an embodiment.

FIG. 11A shows a point map that may be produced using LiDAR system 1000 according to an embodiment. As shown, the point map shows that a relatively large FOV is captured (e.g., approximately −140 to +140 degrees), but substantial curvature is present. FIG. 11B shows an illustrative aperture color map produced by LiDAR system 1000.

Embodiments discussed herein use a multi-faceted mirror to produce a more desirable point map profile. Characteristics of a more desirable point map include point maps that are not excessively bowed and exhibit relatively flat profiles. In some embodiments, a desirable point map may exhibit a rectangular or square shape. It is also desirable to produce a point map that captures a wide field of view, for example, in the horizontal left-to-right or right-to-left orientation.

Figure 12A:
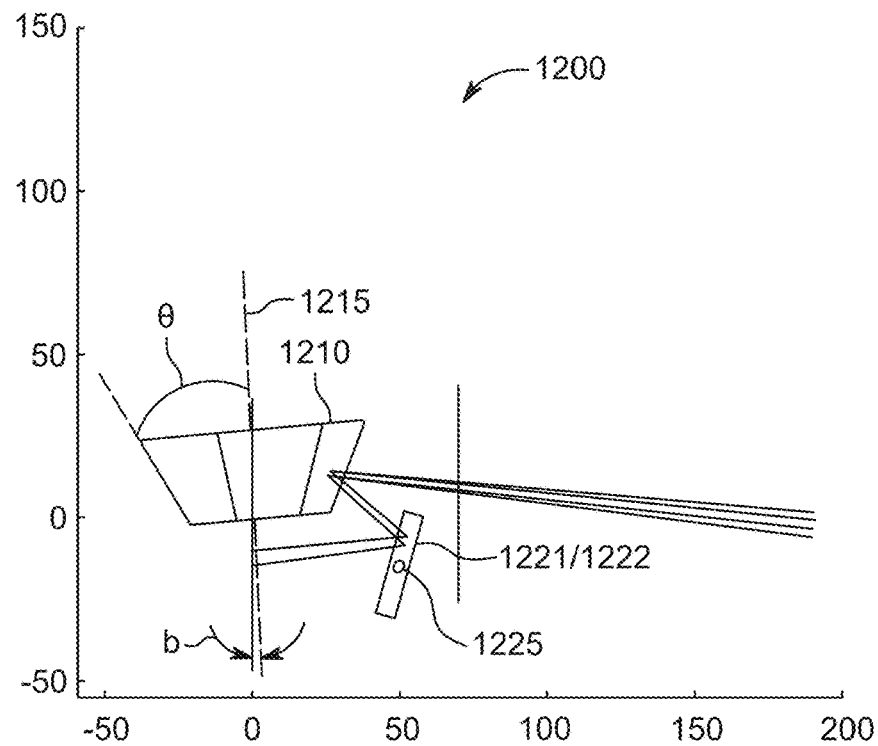
FIGS. 12A and 12B show illustrative side and top views, respectively, of a LiDAR system, according to an embodiment
Figure 12B:
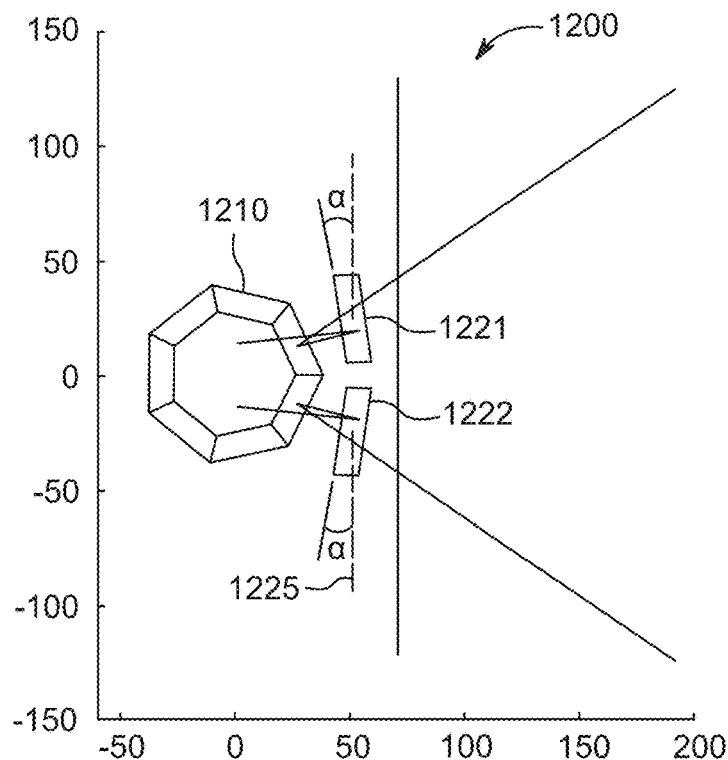

FIGS. 12A and 12B show illustrative side and top views, respectively, of LiDAR system 1200, according to an embodiment. Lidar system 1200 can include multi-faceted polygon 1210 that spins about rotation axis 1215 and multi-faceted galvanometer mirror 1220. Four light beams 1231-1234 are shown interacting with multi-faceted galvanometer mirror 1220 and polygon 1210. Multi-faceted galvanometer mirror 1220 pivots about single rotation axis 1225. Multi-faceted galvanometer mirror 1220 is shown to include two facets 1221 and 1222, though it should be understood that three or more facets may be used. Facets 1221 and 1222 may be coupled to a common structure (not shown) that is coupled to a moving member (e.g., motor) so that when the moving member changes position of the common structure, facets 1221 and 1222 both move in unison. Facets 1221 and 1222 are positioned side by side (as shown in FIG. 12B) with a fixed distance between them (as shown) or facets 1221 and 1222 can be in direct contact with each. In addition, facets 1221 and 1222 are arranged such that their respective faces are not parallel to each other, and such that they are not parallel with mirror rotation axis 1225. In other words, skew angle, $\alpha$, exists between the planar face of each of facets 1221 and 1222 and mirror rotation axis 1225, where $\alpha$ is not equal to 0 degrees. In some embodiments, the angle, $\alpha$, may be fixed as an acute angle or an obtuse angle. In other embodiments, the angle, $\alpha$, may be variable thereby enabling facets 1221 and 1222 to move relative to each other. In this variable angle embodiment, facets 1221 and 1222 may move, for example, in a butterfly fashion. Variable angle embodiments are discussed in more detail below.

Producing a more desirable point map using a multi-facet galvanometer mirror may take many different considerations into account. Considerations pertaining to polygon 1210 are discussed first. Polygon 1210 can be designed to have any number of facets. The construction and orientation of each facet may be such that an angle of polygon facets with respect to rotation axis 1215 is set to a particular angle, shown as g. Polygon 1210 spins about rotation axis 1215 at one or more predetermined speeds. A tilt angle, shown as b, may exist between rotation axis 1215 and a vertical (gravity) axis.

Considerations pertaining to mirror 1220 are now discussed. The location of mirror rotation axis 1225 with respect to polygon 1210 is a factor. The positioning of facets 1221 and 1222 with respect to polygon 1210 is a factor. For example, in FIG. 12B, facets 1221 and 1222 are centered with respect to the 0 degree angle along the Y axis. If desired, facets 1221 and 1222 can be repositioned to be biased to the left or right side of the FOV. The skew angle, which is the angle of facets 1221 and 1222 with respect to mirror rotation axis 1225, is another factor that can be manipulated. In a "normal" case, where a single facet mirror is parallel to the rotation axis, skew angle is 0. As shown in FIG. 12B, facets 1221 and 1222 are not parallel to mirror rotation axis 1225 and thus have askew angle that is non-zero.

Yet other factors that affect the point map include the number of laser beams being used. This includes beam angle and launch point of each laser beam. In some embodiments, the laser beams may be symmetrically distributed across mirror 1220. For example, if there are four beams, two beams may be projected to facet 1221 and two beams may be projected to facet 1222. In other embodiments, the laser beams may be asymmetrically distributed across 1220. For example, if there are four beams, three beams may be projected on to facet 1221 and one beam may be projected on facet 1222. Any one or more of the above considerations can be modified to produce a desired point map.

Figure 13:
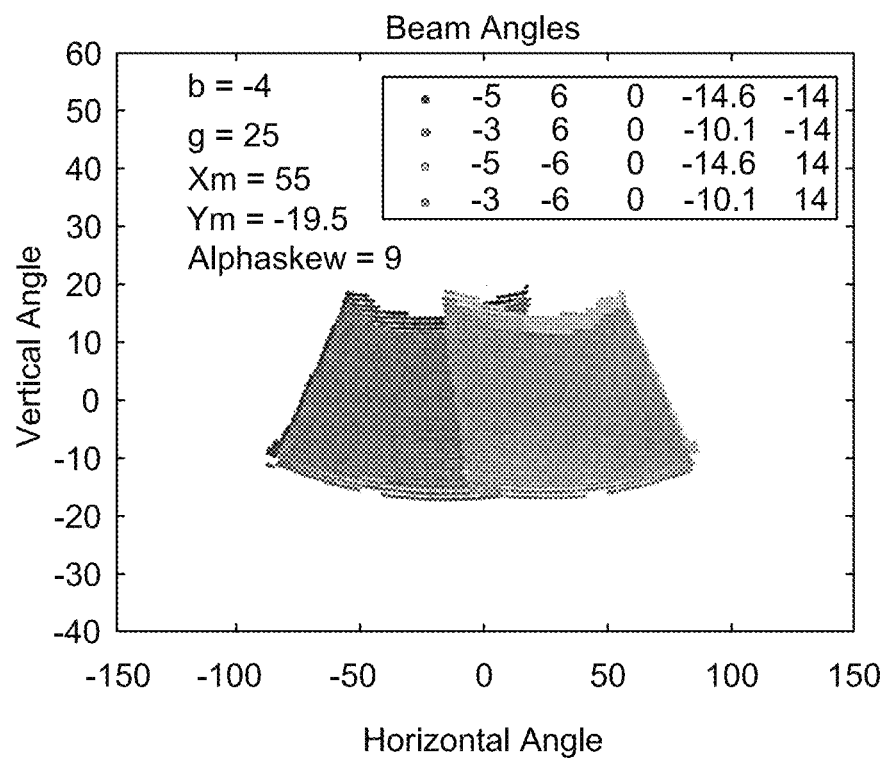
FIG. 13 shows illustrative point map that is produced using LiDAR system of FIGS. 12A and 12B according to an embodiment.
Figure 14:
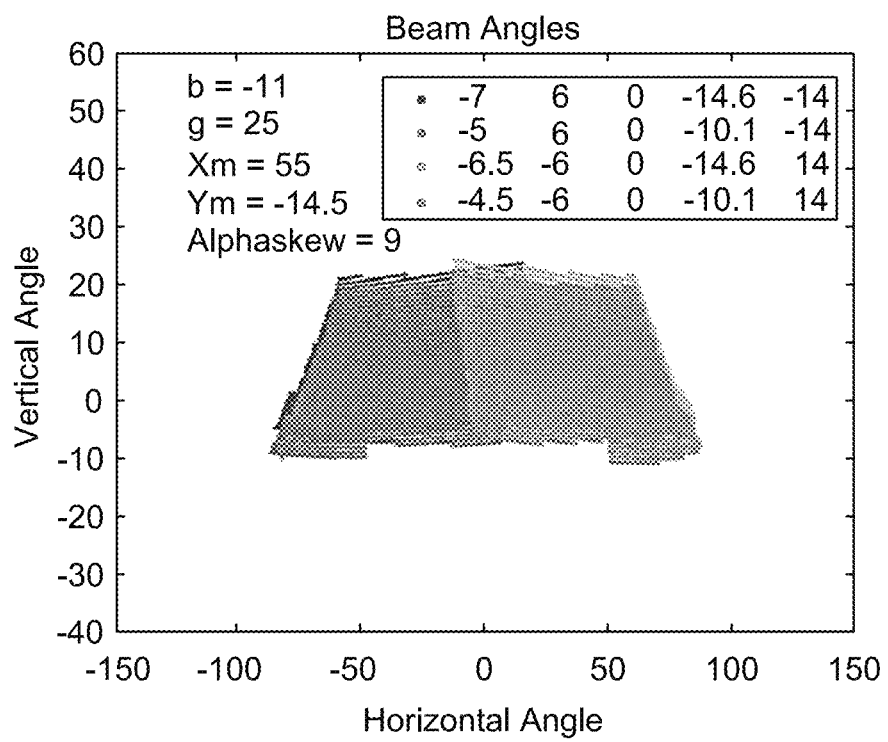
FIG. 14 shows illustrative point map, according to an embodiment

FIG. 13 shows illustrative point map 1300 that is produced using LiDAR system 1200 according to an embodiment. FIG. 13 shows illustrative beam angle and launch points, the tilt angle, b, the angle of facet, g, position of the galvo mirror rotation axis shown by Xm and Ym, and the skew angle. FIG. 14 shows illustrative point map 1400 that is produced using LiDAR system 1200 according to an embodiment. Point map 1400 is produced using a different tilt angle, b, than the tilt angle being used to produce point map 1300.

Figure 15:
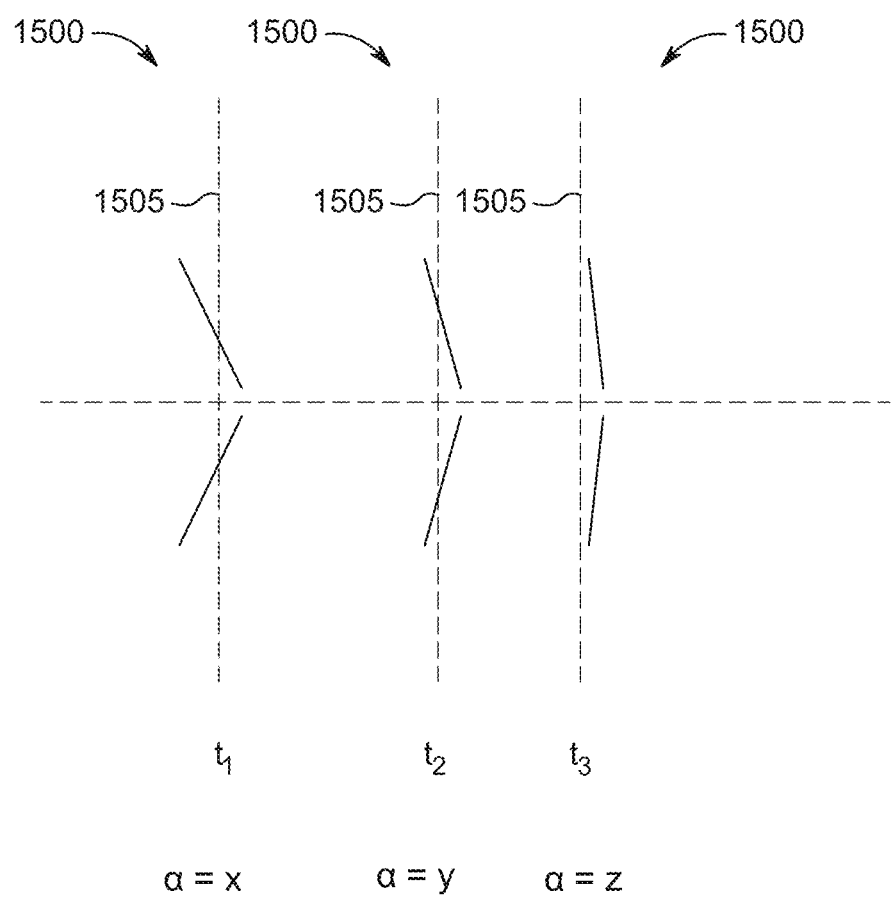
FIG. 15 shows a variable multi-facet galvo mirror according to an embodiment

FIG. 15 shows a variable multi-facet galvo mirror 1500 according to an embodiment. In particular, FIG. 15 shows that the skew angle changes with time. In particular, at time, $t_1$, the skew angle is equal to x, then at time, $t_2$, the skew angle is equal to y, and at time, $t_3$, the skew angle is equal to z, where x>y>z. Both facets of mirror 1500 rotate along mirror rotation axis 1505, but the skew angle is variable. In some embodiments, the skew angle can be controlled independent of the rotation angle of mirror 1500 along its rotation axis 1505. In some embodiments, the skew angle can be linearly dependent on the rotation angle of mirror 1500 along mirror rotation axis 1505. For example, the skew angle can be set to A+/−(C*φ), where A is a skew angle constant, C is a multiplication factor, and φ is the mirror rotation angle of the galvo mirror axis.

Although not shown in FIG. 15, it should be appreciated that the skew angle can change from a positive skew angle to a negative skew angle, or vice versa (and pass through a zero skew angle). It should also be appreciated that each facet may be independently controlled to have to its own controlled skew angle. For example, of the two facets shown in FIG. 15, the skew angle of one facet can be changed independently of the skew angle of the other facet. A benefit of the independent control of the skew angle of each facet is that it may enable dynamic control over the point map.

Figure 16A:
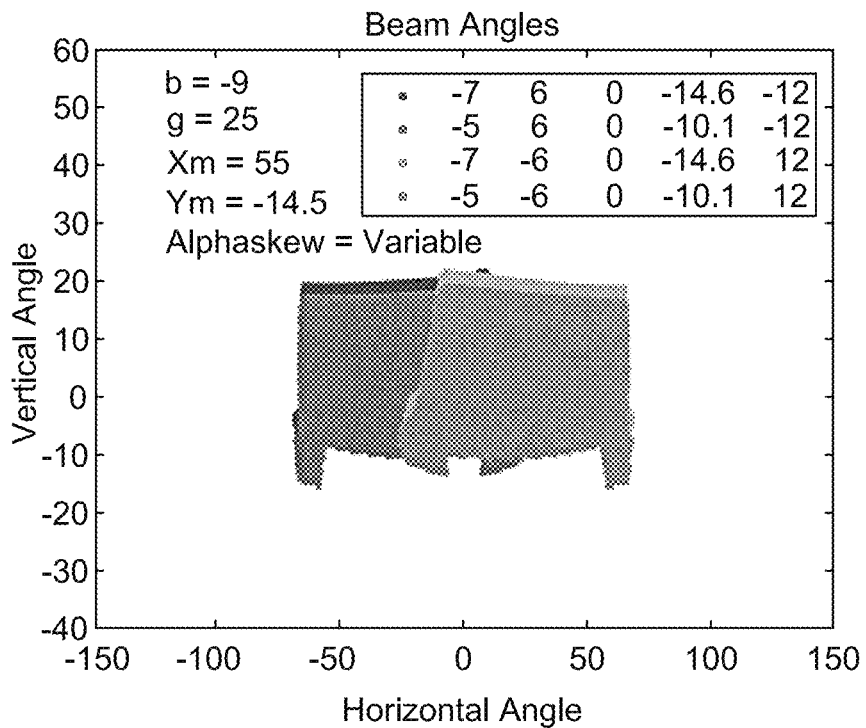
FIG. 16A shows a point map that may be produced using a variable multi-facet galvo mirror according to an embodiment.
Figure 16B:
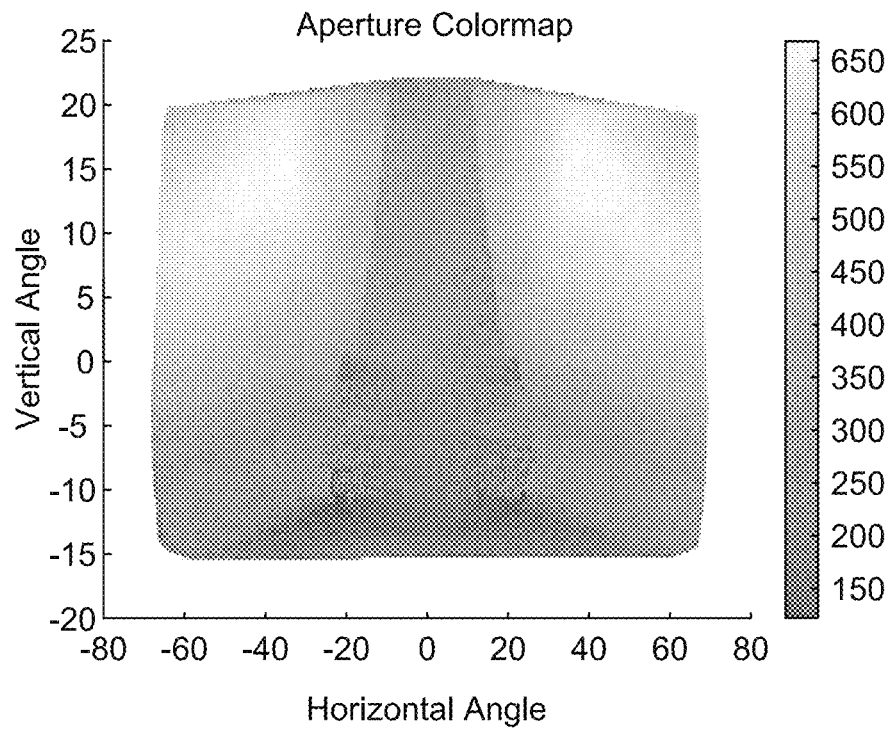
FIG. 16B shows an illustrative aperture color map produced by a LiDAR system using a variable multi-facet galvo mirror, according to an embodiment.

FIG. 16A shows a point map that may be produced using variable multi-facet galvo mirror 1500 according to an embodiment. As shown, the point map shows that a relatively rectangular FOV is captured. FIG. 16B shows an illustrative aperture color map produced by a LiDAR system using variable multi-facet galvo mirror 1500. FIG. 16B shows that two separate relatively high intensity apertures exist at about −40 degrees and at +40 degrees in the horizontal angle.

Figure 17:
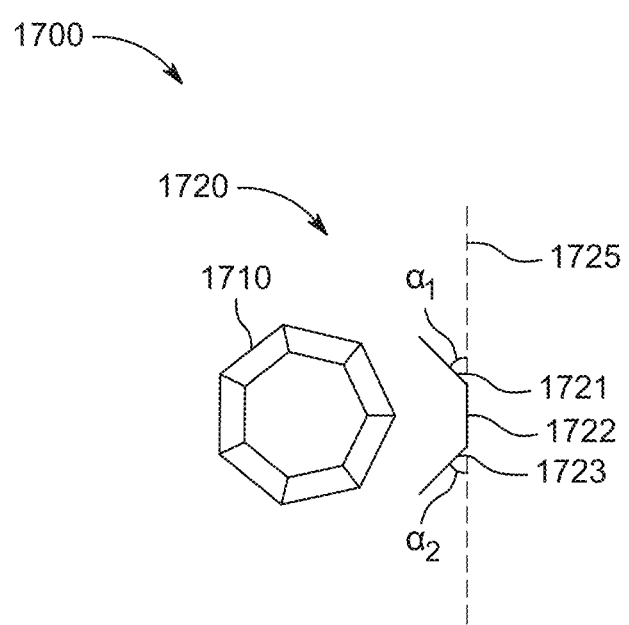
FIG. 17 shows an illustrative LiDAR system according to an embodiment.

FIG. 17 shows illustrative LiDAR system 1700 according to an embodiment. System 1700 includes polygon 1710 and three facet mirror 1720 that rotates about rotation axis 1725. Three facet mirror 1720 includes facets 1721-1723. Facet 1722 is parallel with rotation axis 1725 and thus has a zero skew angle. Facets 1721 and 1723 are not parallel with rotation axis 1725 and have respective skew angles of $\alpha_1$ and $\alpha_2$. In one embodiment, skew angles $\alpha_1$ and $\alpha_2$ may be fixed. In another embodiment, skew angles $\alpha_1$ and $\alpha_2$ may be variable. As a specific example, the variability of skew angles $\alpha_1$ and $\alpha_2$ can be jointly controlled such that $\alpha_1$ is always equal to $\alpha_2$. As another specific example, skew angles $\alpha_1$ and $\alpha_2$ can be independently controlled such that $\alpha_1$ is not necessary the same as $\alpha_2$.

Figure 18:
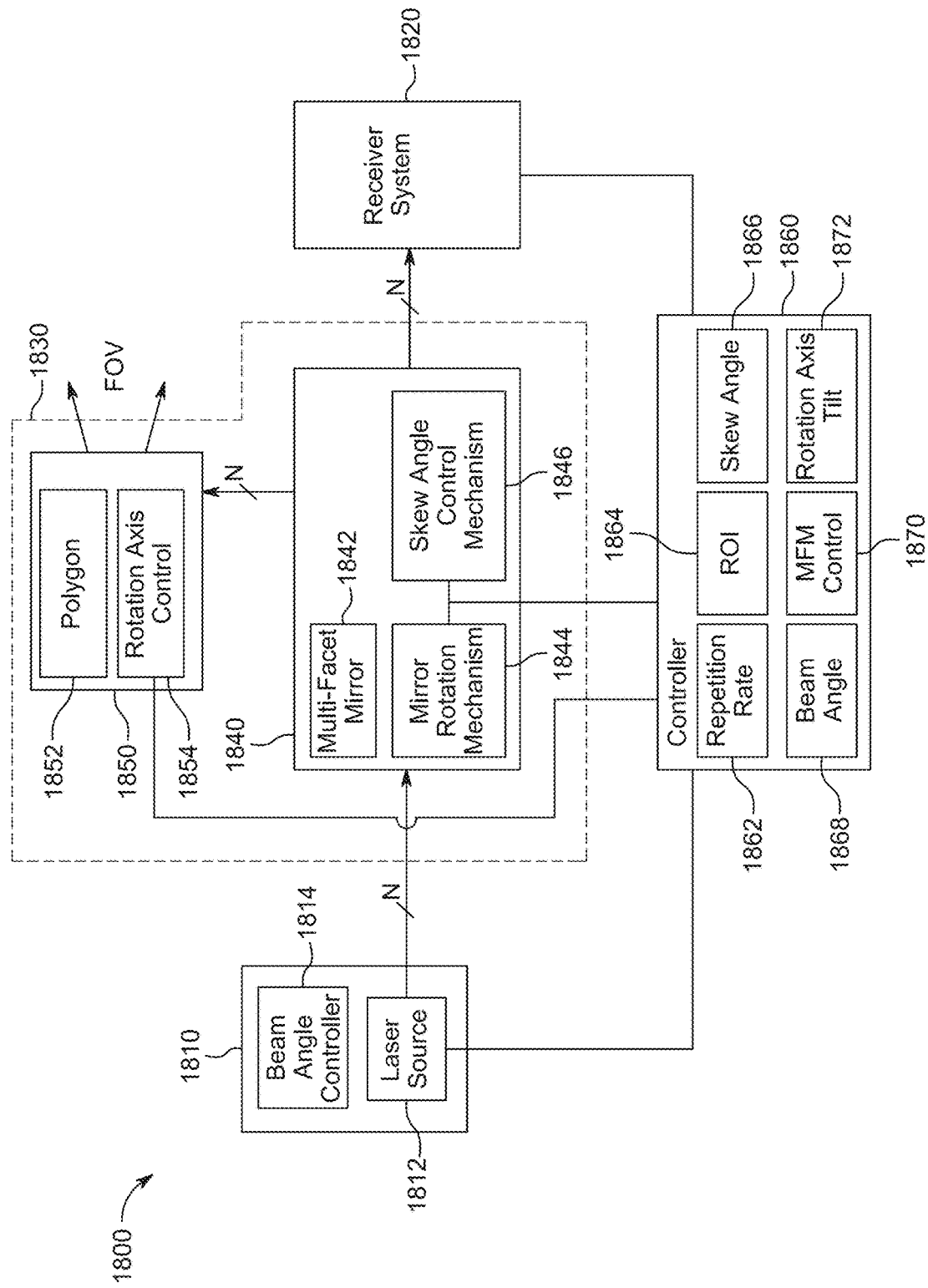
FIG. 18 shows an illustrative block diagram of a LiDAR system according to an embodiment.

FIG. 18 shows an illustrative block diagram of LiDAR system 1800 according to an embodiment. LiDAR system 1800 can include laser subsystem 1810, receiver system 1820, beam steering system 1830, and controller 1860. Laser subsystem 1810 can include laser source 1812 and beam angle controller 1814. Receiver system 1820 can include optics, detectors, and other components (all which are not shown). Beam steering system 1830 can include multi-facet mirror system 1840 and polygon system 1850. Mirror system 1840 can include multi-facet mirror 1842, mirror rotation mechanism 1844, and skew angle control mechanism 1846. Polygon system 1850 can include polygon 1852 and rotation axis control 1854. Controller 1860 may include repetition rate module 1862, range of interest (ROI) module 1864, skew angle module 1866, beam angle module 1868, multi-facet mirror (MFM) control module 1870, and rotation axis tilt module 1872. LiDAR system 1800 may be contained within one or more housings. In multiple housing embodiments, at least one of the housings may be a temperature controlled environment in which select portions of LiDAR system 1800 (e.g., laser source 1812 and controller 1860) are contained therein.

Laser subsystem 1810 may include laser source 1812 and beam angle controller 1814. Laser subsystem 1810 is operative to direct light energy towards beam steering system 1830, which directs light energy to a FOV of the LiDAR system. Laser source 1812 may serve as the only source of light energy, but the light energy may be split into N number of beams using any suitable beam splitting technique or mechanism. Each beam may be positioned within system 1800 to have a particular beam angle and a particular launch point. The beam angle and launch point may affect the point map generated when used in conjunction with beam steering system 1830. In some embodiments, the beam angle and launch point may be fixed. In other embodiments, the beam angle and/or launch point for each beam may be variable and can be controlled by beam angle controller 1814. For example, beam angle controller 1814 may be able to adjust an angle of one or more of the beams based on inputs provided by beam angle module 1868 in controller 1860.

Laser source 1812 may be operative to control the repetition rate at which light energy is emitted in response to controls provided by repetition rate module 1862. The repetition rate refers to the rate at which successive light pulses are emitted by laser source 1812. In some embodiments, the repetition rate may remain fixed. In other embodiments, the repetition rate may be varied. Variation in the repetition rate may be based on a number of different factors, including, for example, desired point map resolution or one or more regions of interest within the FOV, multi-facet mirror movement speed, polygon movement speed, tilt axis, skew angle, and any other suitable criteria. The multi-facet mirror movement speed may refer to the rotation speed of multi-facet mirror 1842. The polygon movement speed may refer to the rotation speed of polygon 1850. Tilt axis may refer to the difference between the rotation axis of polygon 1850 with respect to a gravitational axis.

Multi-facet mirror 1842 may move under the direction of mirror rotation mechanism 1844 and optionally further under control of skew angle control mechanism 1846. Multi-facet mirror 1842 is operative to redirect light beams originating from laser source 1812 to polygon 1852. In addition, multi-facet mirror 1842 is operative to redirect return pulses received via polygon 1852 to receiver system 1820. In one embodiment, mirror rotation mechanism 1844 may be a motor that is coupled to multi-facet mirror 1842. Multi-facet mirror 1842 may be rotated about its rotation axis under the control of MFM control 1870. In embodiments where the skew angle of multi-facet mirror 1842 is fixed, skew angle control mechanism 1846 is not used. In embodiments where the skew angle of multi-facet mirror 1842 is variable, skew angle control mechanism 1846 may be used. Skew angle module 1866 may control the skew angle by instructing skew angle control mechanism 1846. Skew angle control mechanism 1846 may control the skew angle independent of the rotation or dependent on the rotation of multi-facet mirror 1842. If multi-facet mirror 1842 has multiple skew angles, skew angle control mechanism 1846 may exercise independent control over each skew angle. Skew angle control mechanism 1846 may use mechanical linkages to control the position of the skew angle. For example, the mechanical linkage can be a screw based linkage, rack and pinion linkage, or ball screw linkage. In some embodiments, the linkage can be directly tied to mirror rotation mechanism 1844 such that the skew angle is dependent on the rotation position of the mirror along its rotation axis.

Polygon 1852 rotates under the control of rotation axis control 1854 and is operative to direct the light energy received from mirror 1842 to the FOV of LiDAR system 1800. Rotation axis control 1854 may control the speed at which polygon 1852 rotates under the control of MFM control module 1870. Rotation axis control 1854 may also adjust a tilt angle of polygon 1852 under the control of MFM control module 1870.

Controller 1860 is operative to control operation of LiDAR system 1800. Controller 1860 can control where within the FOV light pulses are directed and can process return pulses to populate a point map that may be used by another system such as, for example, an autonomous car. The modules (e.g., modules 1862, 1864, 1866, 1868, 1870, and 1872) may be responsible for controlling the point maps generated using system 1800. Some modules may be interdependent on each other whereas other modules may operate independent of others. The modules may incorporate real-time feedback of point map performance to make necessary adjustments to, for example, repetition rate, mirror rotations speed, skew angle, tilt, etc. The modules may operate based on different modes of operation. For example, LiDAR system 1800 may receive an external input such as vehicle speed, which may be used to determine which mode LiDAR system 1800 should operate. In a first vehicle speed mode (e.g., a slow speed mode), the modules may configure LiDAR system 1800 to operate accordingly to produce point maps more suitable for the first mode. In a second vehicle speed mode, (e.g., a fast speed mode), the modules may configure LiDAR system 1800 to operate accordingly to produce point maps more suitable for the second mode.

Figure 19:
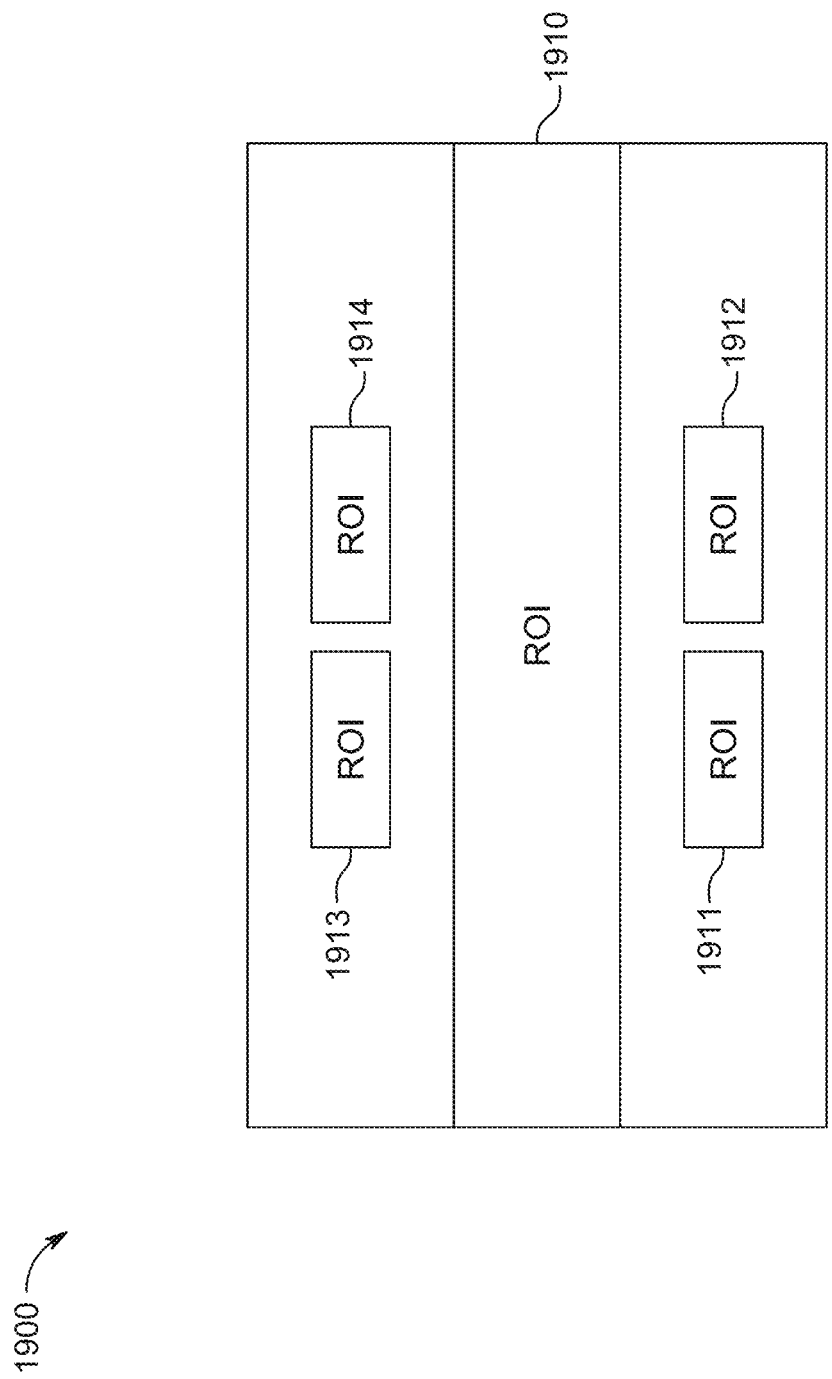
FIG. 19 shows illustrative field of view of a LiDAR system according to an embodiment.

Repetition rate module 1862 may control the repetition rate or time interval of successive light beam emissions of laser source 1812. The repetition rate may be coordinated with one or more of regions of interest, skew angle, mirror rotation speed, and rotation axis tilt. ROI module 1864 may be responsible for controlling laser subsystem 1810 and beam steering system 1830 to ensure one or more regions of interest within the FOV are more accurately captured in the point map. FIG. 19 shows illustrative field of view (FOV) 1900 of a LiDAR system according to an embodiment. As shown, FOV 1900 is a two-dimensional space bounded by X and Y dimensions. Although the LiDAR system can collect data points from the entirety of FOV 1900, certain regions of interest (ROI) may have higher precedence over other regions within FOV 1900 (e.g., such as undesired regions that occupy all space within FOV 1900 that is not a ROI). FIG. 19 shows five different illustrative ROIs 1910-1914 to illustrate different regions within FOV 1900 that require additional data points than other regions within FOV 1900. For example, ROI 1210 occupies an entire band of a fixed y-axis height across the x-axis of FOV 1900. ROIs 1911 and 1912 show localized ROIs below ROI 1910, and ROIs 1913 and 1914 show localized ROIs above ROI 1910. It should be understood that any number of ROIs may exist and that the ROIs can occupy any portion of FOV 1900. ROI module 1864 may operate in conjunction with other modules to enable additional data points to be collected in the ROIs in a manner that does not disrupt the operation of the LiDAR system.

Referring back to FIG. 18, skew angle module 1866 may be operative to control variable skew angles in embodiments where the skew angle is adjustable. Beam angle module 1868 may control the beam angle of one or more light beams. MFM control module 1870 can control the rotation speed of multi-facet mirror 1842. Rotation axis tilt module 1872 may control the tilt axis of polygon 1852. Controller 1860 can coordinate the operation of each module to generate the desired point map.

Figure 20A:
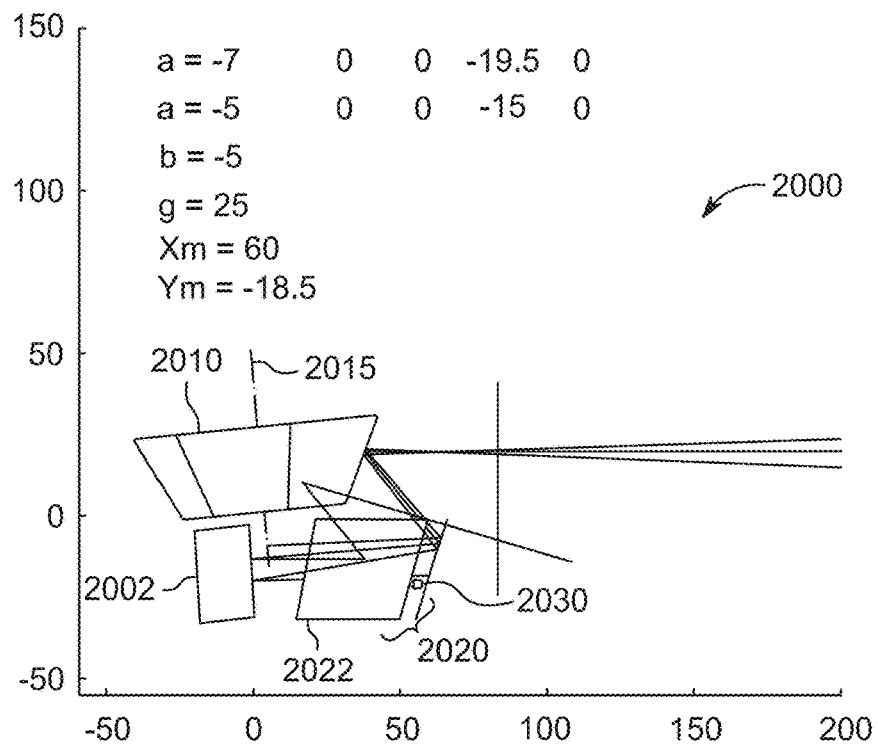
FIGS. 20A and 20B shows an illustrative multi-facet mirror arrangement being used in LiDAR system 2000 according to an embodiment.
Figure 20B:
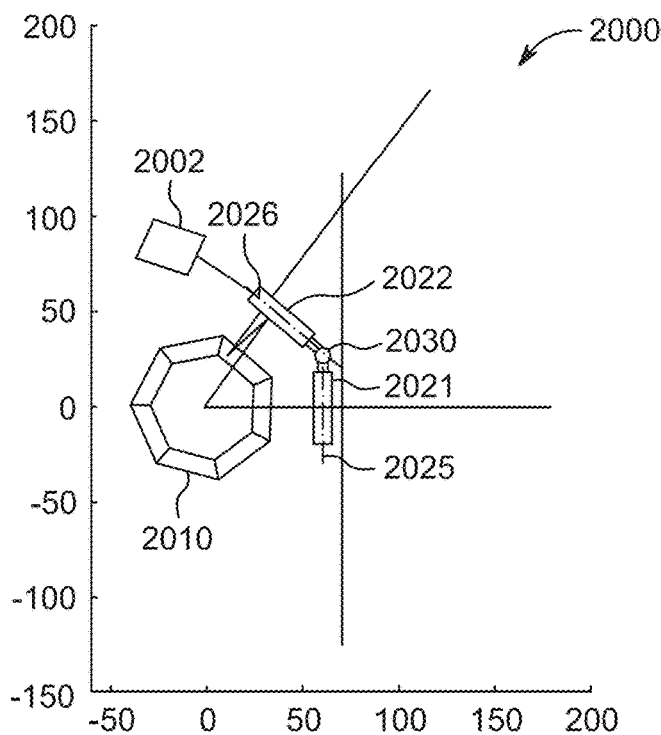
Figure 21A:
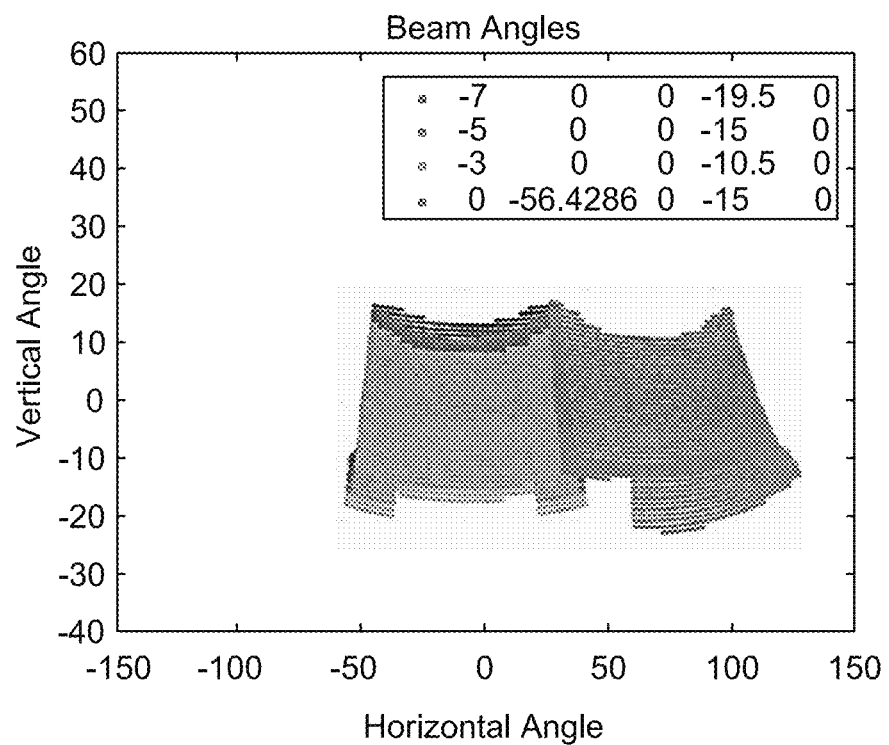
FIGS. 21A and 21B show respective point map and aperture color map.
Figure 21B:
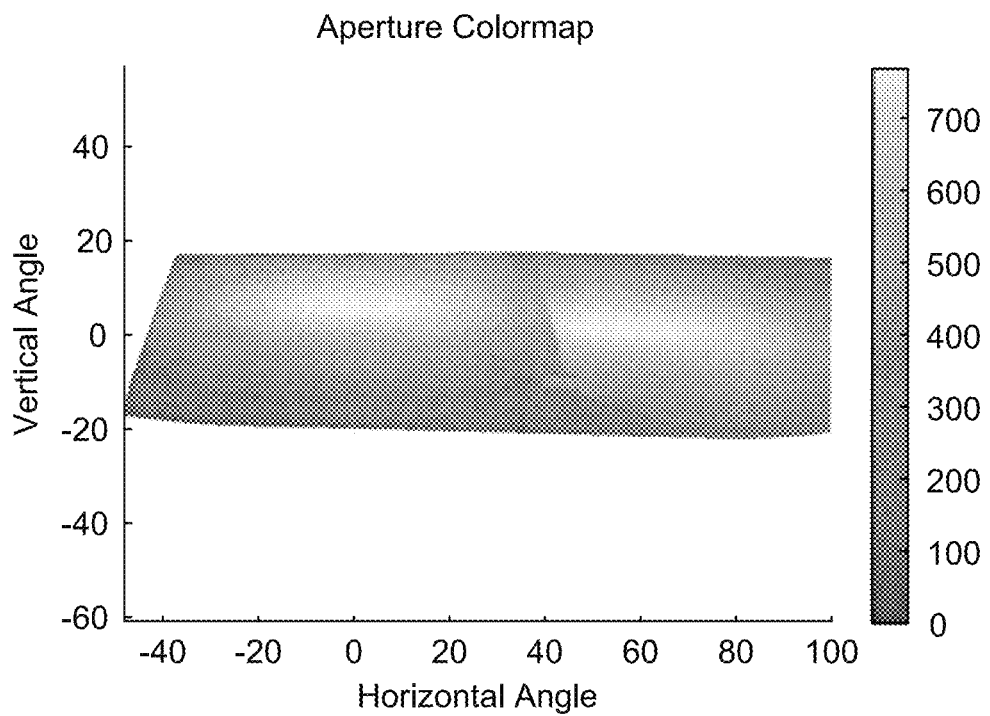

FIGS. 20A and 20B shows an illustrative multi-facet mirror arrangement being used in LiDAR system 2000 according to an embodiment. LiDAR system 2000 includes polygon 2010 that rotates around rotation axis 2015, motor 2002, and multi-facet mirror 2020. Multi-facet mirror 2020 includes facets 2021 and 2022 that are connected together via joint member 2030. Facet 2022 is connected to motor 2002. Facet 2021 is parallel with rotation axis 2025 and facet 2022 is parallel with rotation axis 2026. Motor 2002 is operative to oscillate facet 2022 about rotation axis 2026. Joint member 2030 can translate rotational movement of motor 2002 (via facet 2022) to oscillate facet 2021 along rotation axis 2025. For example, joint member 2030 may be a constant velocity type of joint or universal joint that translates rotation of facet 2022 to facet 2021. Thus, even though only one motor is being used to drive oscillation of facets 2021 and 2022, joint member 2030 is able to translate rotation of motor 2002 such that both facets rotate about their respective axes. Thus, use of a single motor (i.e., motor 2002) in combination with joint member 2030 advantageously eliminates the redundant use of one motor per rotational axis. Four beams may be aimed at mirror 2020, with three beams interacting with facet 2021 and one beam interacting with facet 2022. The beam and mirror arrangement produces a point cloud that is relatively dense in the forward portion of the FOV and relatively sparse in the side portion of the FOV. See FIGS. 21A and 21B, which show respective point map and aperture color map that may be generated using LiDAR system 2000.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-21, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system for use with a vehicle, comprising:
    a light source operative to emit one or more light beams;
    a multi-faceted polygon structure that is operative to control scanning the light beams in a horizontal direction of a field of view (FOV) of the LiDAR system, wherein an angle of at least one facet of the multi-faceted polygon structure with respect to a rotational axis of the multi-faceted polygon structure is a non-zero angle;
    a moveable mirror positioned to redirect the light beams passing between the light source and the multi-faceted polygon structure, the moveable mirror being operative to control scanning the light beams in a vertical direction of the FOV of the LiDAR system; and
    a skew angle controller operative to control a skew angle of the moveable mirror, wherein the skew angle of the moveable mirror is formed by a planar surface of the moveable mirror with respect to a rotational axis of the moveable mirror.

2. The LiDAR system of claim 1, wherein the moveable mirror is operative to at least partly produce a point cloud that is dense in one predetermined portion and sparse in another predetermined portion.

3. The LiDAR system of claim 2, wherein the light source is operative to emit a plurality of light beams, wherein the point cloud is at least partially produced using an arrangement of the plurality of light beams and the moveable mirror, the point cloud being dense in the forward portion of the FOV and sparse in the side portion of the FOV.

4. The LiDAR system of claim 1, wherein the moveable mirror is a single facet mirror.

5. The LiDAR system of claim 4, wherein a rotational axis of the single facet mirror is parallel to a planar face of the single facet mirror.

6. The LiDAR system of claim 5, wherein the single facet mirror is positioned to direct two light beams to a same facet of the multi-faceted polygon structure.

7. The LiDAR system of claim 5, wherein the single facet mirror is positioned to direct two light beams to two neighboring facets of the multi-faceted polygon structure.

8. The LiDAR system of claim 1, further comprising:
   a detector configured to detect returned light pulses; and
   a lens configured to focus returned light pulses to the detector.

9. The LiDAR system of claim 1, wherein the light source is a fiber optic light source.

10. The LiDAR system of claim 1 wherein the light source is a semiconductor based emitter light source.

11. The LiDAR system of claim 1, wherein the multi-faceted polygon structure is operative to rotate about a rotational axis at one or more predetermined speeds.

12. The LiDAR system of claim 1, wherein a rotational axis of the multi-faceted polygon structure and a gravity axis of the multi-faceted polygon structure form a tilt angle.

13. The LIDAR system of claim 1, wherein the multi-faceted polygon structure and the moveable mirror are positioned at different vertical heights.

* * * * *